United States Patent
Kwon

(10) Patent No.: US 10,747,060 B2
(45) Date of Patent: Aug. 18, 2020

(54) LIQUID CRYSTAL DISPLAY

(71) Applicant: Samsung Display Co., Ltd., Yongin-si (KR)

(72) Inventor: Oh Jeong Kwon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 228 days.

(21) Appl. No.: 15/937,818

(22) Filed: Mar. 27, 2018

(65) Prior Publication Data

US 2019/0121202 A1    Apr. 25, 2019

(30) Foreign Application Priority Data

Oct. 24, 2017  (KR) ................. 10-2017-0138433

(51) Int. Cl.
  *G02F 1/1337*  (2006.01)
  *G02F 1/1368*  (2006.01)
(52) U.S. Cl.
  CPC .. *G02F 1/133711* (2013.01); *G02F 1/133707* (2013.01); *G02F 1/133788* (2013.01);
  (Continued)

(58) Field of Classification Search
  CPC ......... G02F 1/133711; G02F 1/133788; G02F 2001/133742; Y10T 428/1023
  See application file for complete search history.

(56) References Cited

U.S. PATENT DOCUMENTS 9,709,852 B2      7/2017  Lee et al.
2015/0029455 A1*  1/2015  Kim ................. G02F 1/133788
                                                    349/129

(Continued)

FOREIGN PATENT DOCUMENTS

KR    1020160108718    9/2016
KR    1020170019544    2/2017

*Primary Examiner* — Sophie Hon
(74) *Attorney, Agent, or Firm* — H.C. Park & Associates, PLC

(57) ABSTRACT

A display device includes: a first substrate; a second substrate overlapping the first substrate and separated from the first substrate; a liquid crystal layer disposed between the first substrate and the second substrate, and including a plurality of liquid crystal molecules; a first alignment layer disposed between the first substrate and the liquid crystal layer; and a second alignment layer disposed between the second substrate and the liquid crystal layer, wherein the first alignment layer includes at least one of a compound represented by Chemical Formula 1 and a compound represented by Chemical Formula 2:

(Continued)

(Chemical Formula 1)

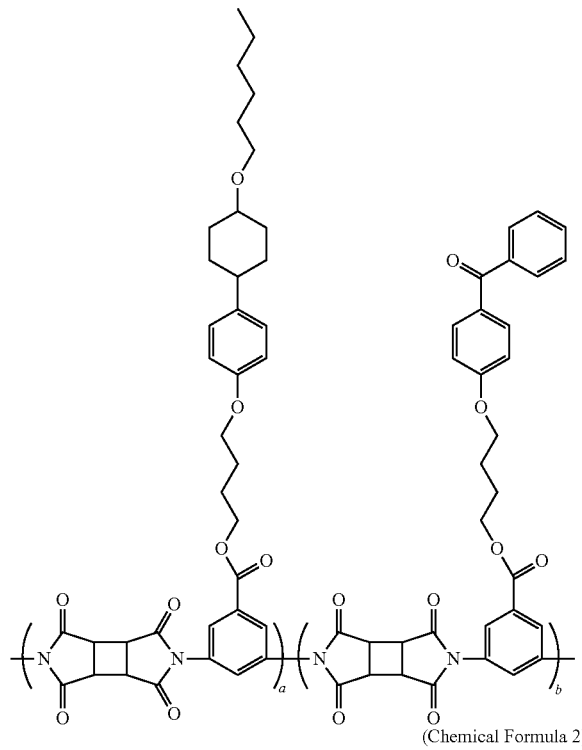

(Chemical Formula 2)

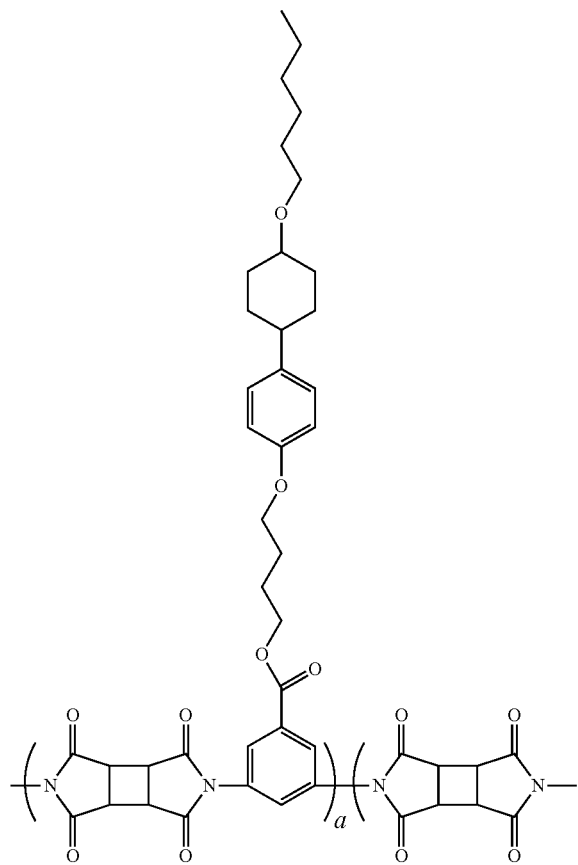

-continued

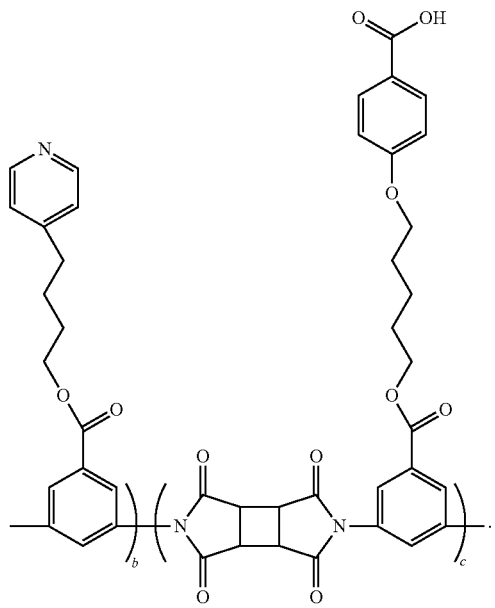

13 Claims, 9 Drawing Sheets

(52) U.S. Cl.
CPC .. *G02F 1/1368* (2013.01); *G02F 2001/13685* (2013.01); *G02F 2001/133726* (2013.01); *G02F 2001/133742* (2013.01); *G02F 2001/133773* (2013.01); *Y10T 428/1023* (2015.01)

(56) References Cited

U.S. PATENT DOCUMENTS

| | | | |
|---|---|---|---|
| 2016/0032190 A1* | 2/2016 | Lim | C09K 19/3838 349/123 |
| 2016/0124277 A1 | 5/2016 | Lee et al. | |
| 2016/0170268 A1* | 6/2016 | Song | G02F 1/133707 349/123 |
| 2017/0045783 A1 | 2/2017 | Lim | |

\* cited by examiner

LIQUID CRYSTAL DISPLAY

CROSS-REFERENCE TO RELATED APPLICATION

This application claims priority from and the benefit of Korean Patent Application No. 10-2017-0138433, filed on Oct. 24, 2017, which is hereby incorporated by reference for all purposes as if fully set forth herein.

BACKGROUND

Field

Exemplary embodiments/implementations of the invention relate generally to a liquid crystal display (LCD).

Discussion of the Background

A liquid crystal display (LCD) includes two display panels that include field generating electrodes such as a pixel electrode and a common electrode, and a liquid crystal disposed between the two display panels.

In the liquid crystal display, a voltage is applied to the field generating electrodes to from an electric field in the liquid crystal layer and controls polarization of incident light through the electric field, thereby displaying an image.

Recently, a curved display has gained interest for its improved sense of immersion. In an implementation of the curved display, it is important to maintain the same level of color and image quality as a flat display.

The above information disclosed in this Background section is only for understanding of the background of the inventive concepts, and, therefore, it may contain information that does not form the prior art.

SUMMARY

Display devices constructed according to exemplary embodiments of the invention are capable of preventing asymmetrical accumulation of an ion impurity in a display panel.

A display device according to an exemplary embodiment includes a first substrate, a second substrate overlapping the first substrate and separated from the first substrate, a liquid crystal layer disposed between the first substrate and the second substrate and including a plurality of liquid crystal molecules, a first alignment layer disposed between the first substrate and the liquid crystal layer, and a second alignment layer disposed between the second substrate and the liquid crystal layer. The first alignment layer includes at least one of a compound represented by Chemical Formula 1 and a compound represented by Chemical Formula 2:

(Chemical Formula 1)

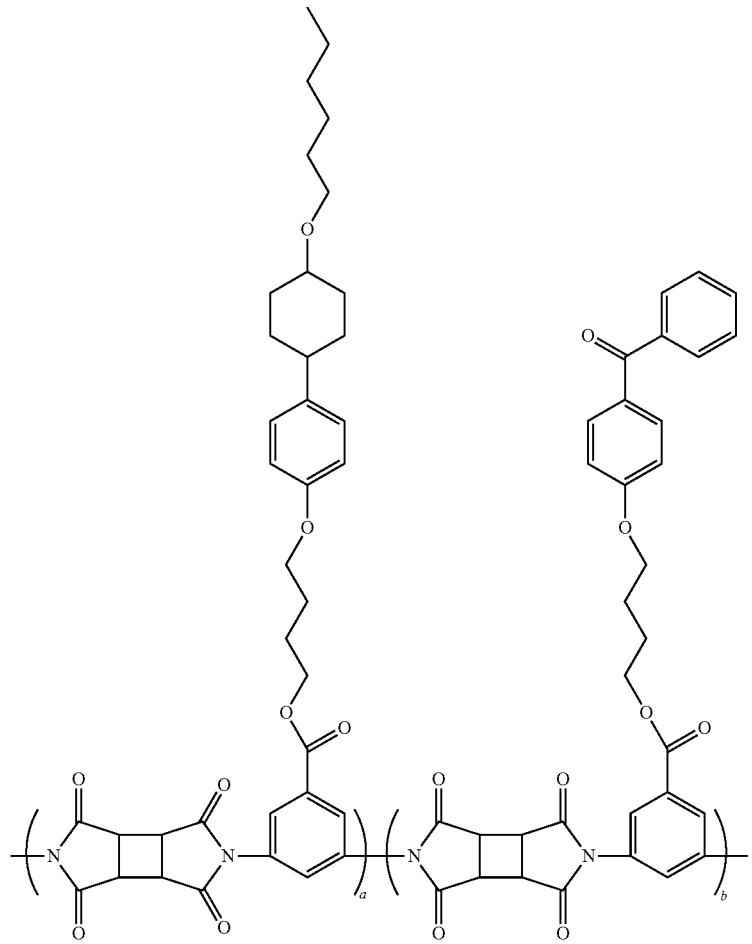

(Chemical Formula 2)
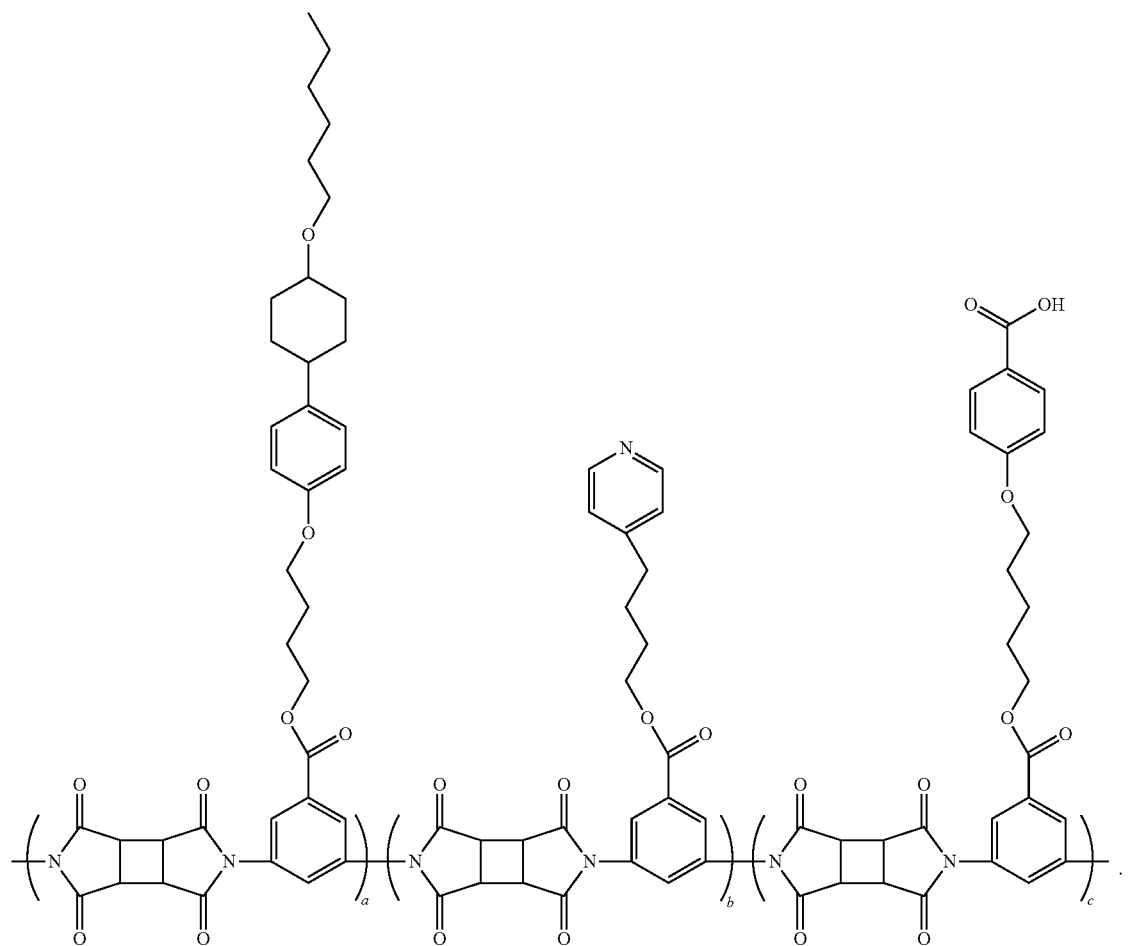

In Chemical Formula 1 and Chemical Formula 2, a, b, and c have values that are greater than 0 and less than 1.

The first alignment layer may include the compound represented by Chemical Formula 1, and the second alignment layer may not include a photo-polymerizable group.

The second alignment layer may include a compound represented by Chemical Formula 3:

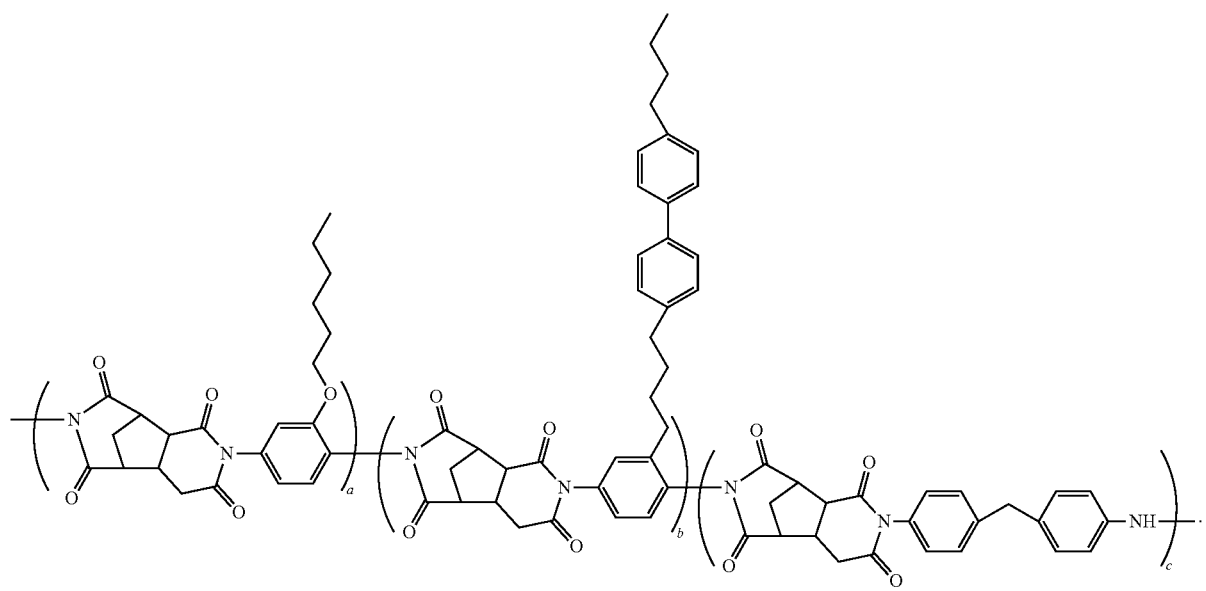

(Chemical Formula 3)

In Chemical Formula 3, a, b, and c have values that are greater than 0 and less than 1.

The liquid crystal display may include a plurality of protrusions that are disposed between the first alignment layer and the liquid crystal layer, wherein at least one of the plurality of protrusions may include a photo-polymerizable group and a polymer polymerized with a reactive mesogen.

While no voltage is applied, liquid crystal molecules that are adjacent to the first substrate may have a pre-tilt and liquid crystal molecules that are adjacent to the second substrate may be re aligned to be vertical with respect to the second substrate.

The liquid crystal display may be a curved type of liquid crystal display.

A display device according to another exemplary embodiment includes a first substrate, a second substrate overlapping the first substrate and separated from the first substrate, a liquid crystal layer disposed between the first substrate and the second substrate, and including a plurality of liquid crystal molecules, a first alignment layer that is disposed between the first substrate and the liquid crystal layer, and a second alignment layer disposed between the second substrate and the liquid crystal layer. The first alignment layer and the second alignment layer include a compound represented by Chemical Formula 4:

(Chemical Formula 4)
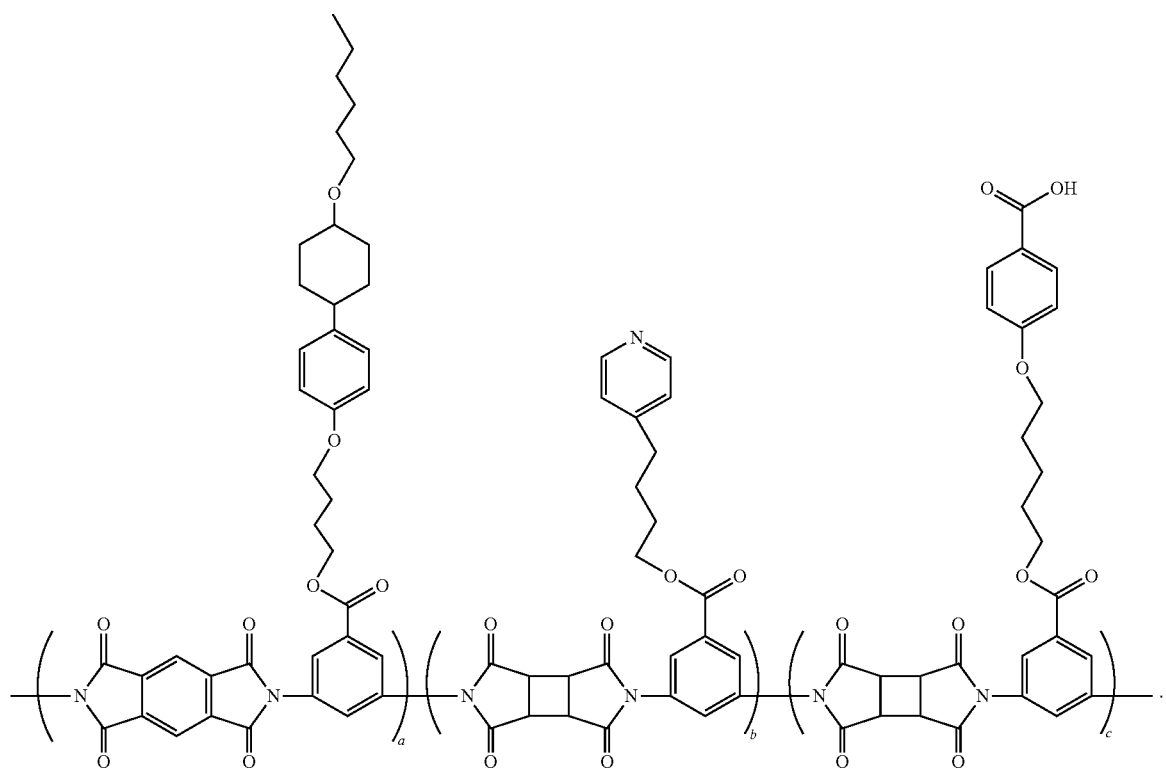
In Chemical Formula 4, a, b, and c have values that are greater than 0 and less than 1.
The first alignment layer may further include a compound represented by Chemical Formula 1:
(Chemical Formula 1)

In Chemical Formula 1, a and b have values that are greater than 0 and less than 1.

The second alignment layer may further include a compound represented by Chemical Formula 5:

(Chemical Formula 5)

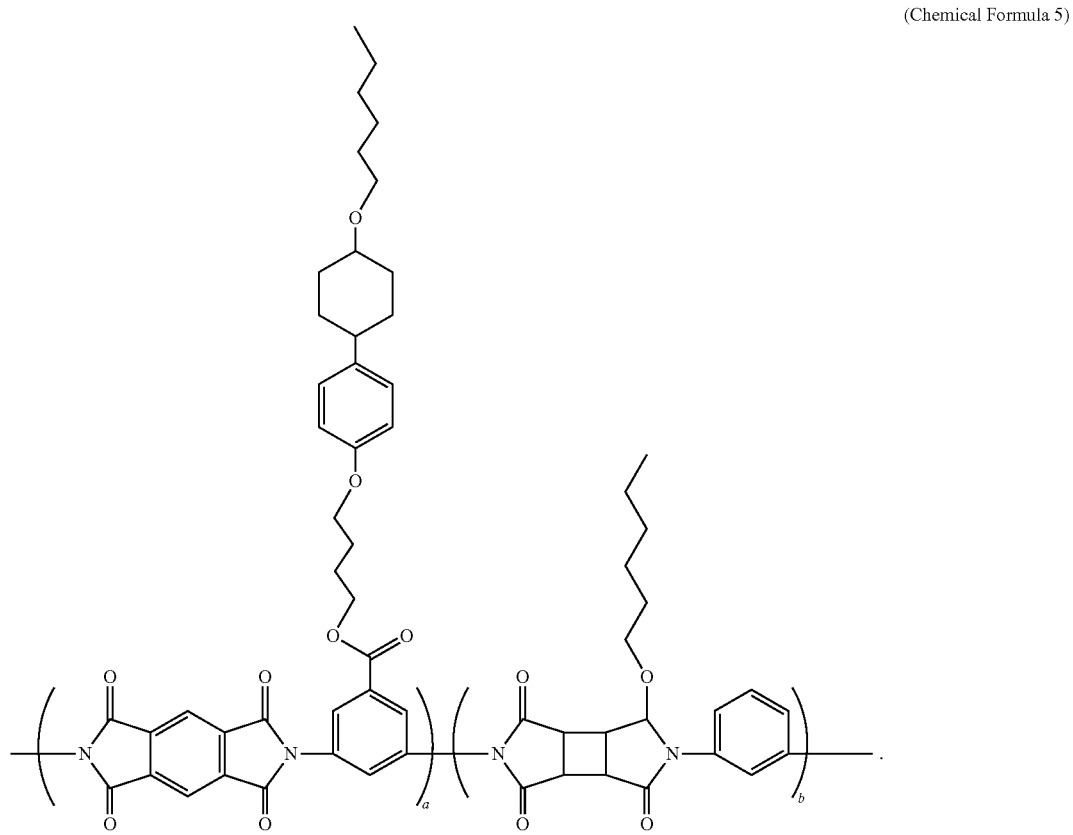

In Chemical Formula 5, a and b have values that are greater than 0 and less than 1.

A liquid crystal display according to another exemplary embodiment includes a first substrate, a second substrate overlapping the first substrate and separated from the first substrate, a liquid crystal layer disposed between the first substrate and the second substrate and including a plurality of liquid crystal molecules, a first alignment layer disposed between the first substrate and the liquid crystal layer, and a second alignment layer disposed between the second substrate and the liquid crystal layer. When no voltage is applied, liquid crystal molecules that are adjacent to the first alignment layer may be tilted with respect to the first substrate at an angle greater than an angle at which liquid crystal molecules that are adjacent to the second alignment layer may be tilted with respect to the second substrate. The first alignment layer and the second alignment layer may not include an aromatic dianhydride.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
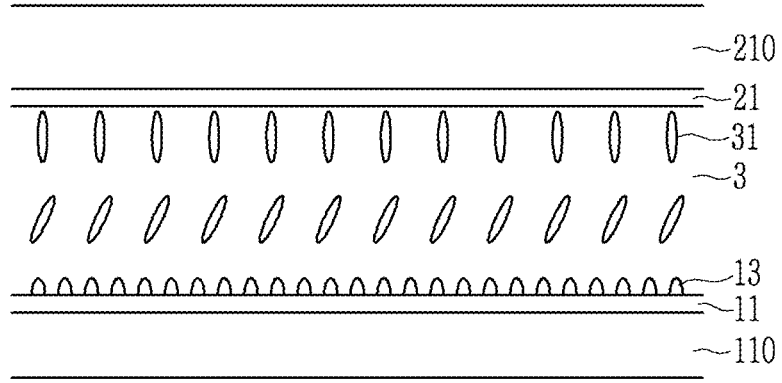
FIG. 1 and FIG. 2 are cross-sectional views of a liquid crystal display according to an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalties between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
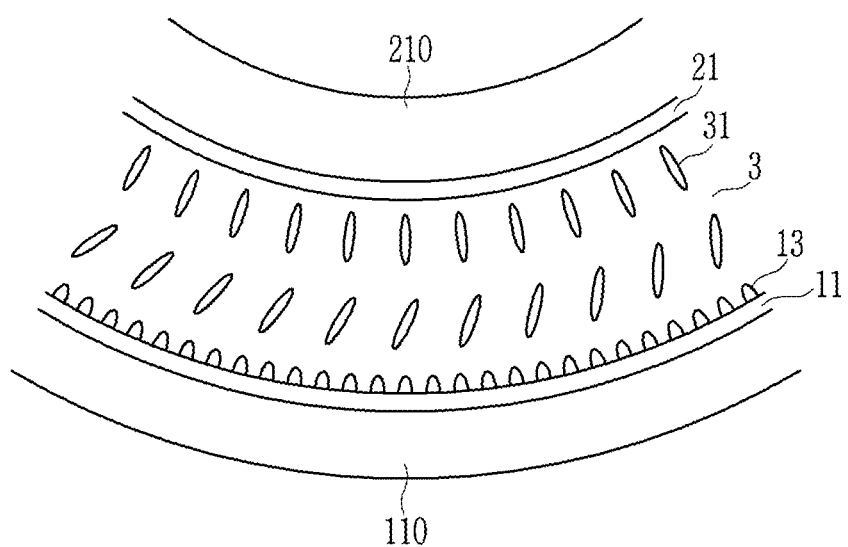

Hereinafter, a liquid crystal display according to an exemplary embodiment of the present invention will be described with reference to FIG. 1 and FIG. 2. FIG. 1 and FIG. 2 are schematic cross-sectional views of the liquid crystal display according to the exemplary embodiment of the present invention.

Referring to FIG. 1, a liquid crystal display according to an exemplary embodiment includes a first substrate 110, a second substrate 210 that is disposed apart from the first substrate 110 while overlapping the same, a liquid crystal layer 3 that is disposed between the first substrate 110 and the second substrate 210 and includes a plurality of liquid crystal molecules 31, a first alignment layer 11 that is disposed between the first substrate 110 and the liquid crystal layer 3, and a second alignment layer 21 that is disposed between the second substrate 210 and the liquid crystal layer 3.

The liquid crystal display according to the exemplary embodiment may include a plurality of protrusions 13 that are disposed between the first alignment layer 11 and the liquid crystal layer 3. The present specification describes an exemplary embodiment in which additional protrusions 13 are not provided between the second alignment layer 21 and the liquid crystal layer 3, but this is not restrictive. The protrusions 13 may be provided between the second alignment layer 21 and the liquid crystal layer 3. However, the number of protrusions disposed between the second alignment layer 21 and the liquid crystal layer 3 may be smaller than the number of protrusions disposed between the first alignment layer 11 and the liquid crystal layer 3.

The protrusions 13 may include a polymer formed by combining a reactive mesogen and a photo-polymerizable group included in the first alignment layer 11. According to the exemplary embodiment of the present invention, a compound represented by Chemical Formula 1 included in the first alignment layer 11 includes the photo-polymerizable group, and an alignment material included in the second alignment layer 21 does not include an additional photo-polymerizable group.

The reactive mesogen may include any material that causes the liquid crystal molecules 31 to be pre-tilted by reacting with the photo-polymerizable group, and for example, may include at least one of acrylate, methacrylate, epoxy, oxethane, vinyl-ether, and styrene.

The reactive mesogen injected into the liquid crystal layer 3 in an electric field UV process may be polymerized while being located adjacent to the first alignment layer 11. The plurality of protrusions 13 formed by polymerization of the reactive mesogen may be provided between the first alignment layer 11 and the liquid crystal layer 3.

A pretilt angle of the liquid crystal molecules 31 adjacent to the first substrate 110 and a pretilt angle of the liquid crystal molecules 31 adjacent to the second substrate 210 may be different from each other. The liquid crystal molecules 31 adjacent to the first substrate 110 may be pre-tilted by the plurality of protrusions 13. The pretilt angle of the liquid crystal molecules 31 that are adjacent to the first alignment layer 11 may be greater than that of the liquid crystal molecules 31 that are adjacent to the second alignment layer 21. The liquid crystal molecules 31 that are adjacent to the second alignment layer 21 may be aligned substantially perpendicular to the second alignment layer 21.

Throughout the specification, the term "pretilt" refers to the tilt of liquid crystal molecules 31 with reference to a direction that is perpendicular to the surface of the first alignment layer 11 or the surface of the second alignment layer 21. In addition, the term "pretilt angle" refers to a degree of tilting with reference to an axis that is perpendicular to the first alignment layer 11 or the second alignment layer 21, that is, a tilted angle.

The first alignment layer 11 may include at least one of a compound represented by Chemical Formula 1 and a compound represented by Chemical Formula 2. In Chemical Formula 1 and Chemical Formula 2, a, b, and c are values that are greater than zero and less than 1, and may be changed depending on the exemplary embodiment. The first alignment layer 11 according to the exemplary embodiment may not include an aromatic dianhydride.

The compound represented by Chemical Formula 1 may include a vertical alignment group that vertically aligns the liquid crystal molecules 31. In addition, the compound represented by Chemical Formula 1 may include a photo-polymerizable group that reacts with the reactive mesogen that is injected into the liquid crystal layer 3.

The compound represented by Chemical Formula 2 may include a vertical alignment group that vertically aligns the liquid crystal molecules 31. In addition, the compound represented by Chemical Formula 2 may include a functional group that can enhance an afterimage and the like of the display device.

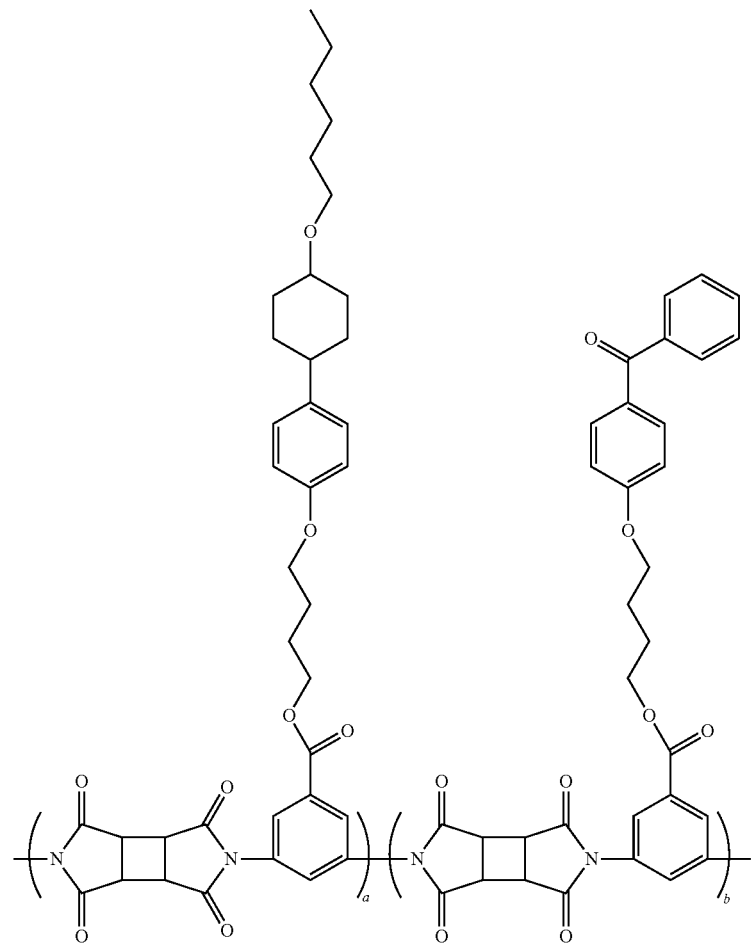
(Chemical Formula 1)

(Chemical Formula 2)

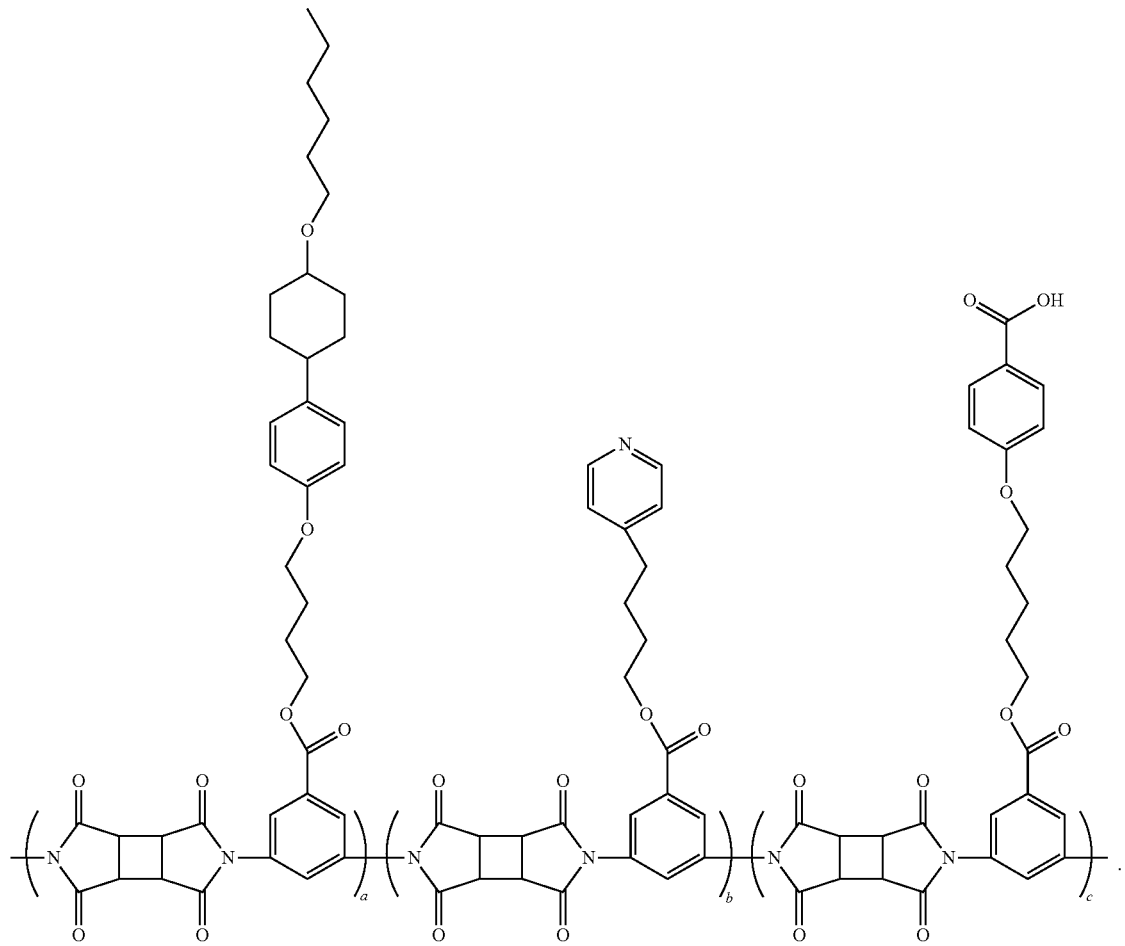

The first alignment layer 11 may have a multi-layer structure. A layer that is adjacent to the liquid crystal layer 3 may include the compound represented by Chemical Formula 1. A layer adjacent to the first substrate 110 may include the compound represented by Chemical Formula 1.

However, this is not restrictive, and the first alignment layer 11 may include one layer. In this case, the content of the compound represented by Chemical Formula 1 may be greater than the content of the compound represented by Chemical Formula 2 at a location adjacent to the liquid crystal layer 3 in the first alignment layer 11. In addition, the content of the compound represented by Chemical Formula 2 may be greater than the content of the compound represented by Chemical Formula 1 at a location adjacent to the first substrate 110.

Meanwhile, an ion impurity may be generated in an organic layer (e.g., a color filter) included in the liquid crystal display (LCD). The ion impurity may be injected into the liquid crystal layer 3 and may tend to be combined with an aromatic dianhydride, from an alignment layer, that has strong polarity (e.g., a negative (−) polarity). The liquid crystal display according to the exemplary embodiment provides the first alignment layer 11 that does not include the aromatic dianhydride so that accumulation of an ion impurity near the first alignment layer 11 can be prevented.

The second alignment layer 21 according to the exemplary embodiment may include a compound represented by Chemical Formula 3. In Chemical Formula 3, a, b, and c have values that are greater than zero and less than 1, and may be changed depending on exemplary embodiments.

(Chemical Formula 3)

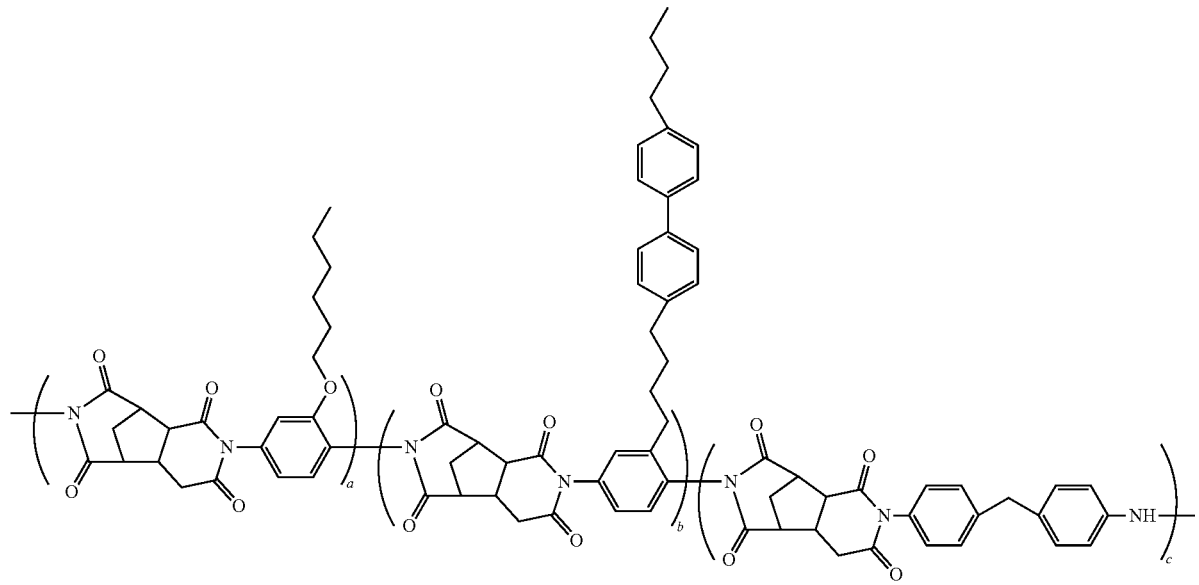

In case of an existing liquid crystal display, the second alignment layer 21 may include the compound represented by Chemical Formula 3. The first alignment layer 11 may include the compound that includes the aromatic dianhydride. In such a case, the first alignment layer 11 has strong power to pull an ion impurity injected into the liquid crystal layer 3 and the second alignment layer 21 has weak power to pull an ion impurity injected into the liquid crystal layer 3 so that the ion impurities may be asymmetrically accumulated in areas adjacent to the first alignment layer 11. Since a large amount of ion impurities are accumulated in the area adjacent to the first substrate 110, a common voltage may be partially changed. This is called common voltage shift. In particular, ion impurity accumulation and common voltage shift may predominantly occur in an area that overlaps a blue color filter. Thus, a color to be represented in an area where a blue color is emitted is changed, thereby causing a yellowish blue color to be viewed.

However, since the first alignment layer 11 and the second alignment layer 21 according to the exemplary embodiment of the present invention do not include the aromatic dianhydride, ion impurity accumulation in one display panel can be prevented. Accordingly, the display device that can prevent the common voltage shift and improve display quality can be provided.

Hereinafter, another exemplary embodiment of the alignment that has the same structure as the liquid crystal display of FIG. 1 but including a different material will be described. Description of the same components as those described above will be omitted.

A first alignment layer 11 according to the other exemplary embodiment may include at least one of a compound represented by Chemical Formula 1 and a compound represented by Chemical Formula 2. For example, the first alignment layer 11 may include a compound represented by Chemical Formula 4 and may further include the compound represented by Chemical Formula 1. In Chemical Formula 1 and Chemical Formula 4, a, b, and c may have values that are greater than zero and less than 1, and the values may be changed depending on exemplary embodiments.

The compound represented by Chemical Formula 1 may include a vertical alignment group that vertically aligns liquid crystal molecules 31. In addition, the compound represented by Chemical Formula 1 may include a photopolymerizable group that reacts with a reactive mesogen that is injected into the liquid crystal layer 3.

The compound represented by Chemical Formula 4 may include a vertical alignment group that vertically aligns the liquid crystal molecules 31. The compound represented by Chemical Formula 4 may include a functional group that can enhance an afterimage and the like of the display device. In addition, the compound represented by Chemical Formula 4 may include an aromatic dianhydride.

(Chemical Formula 1)
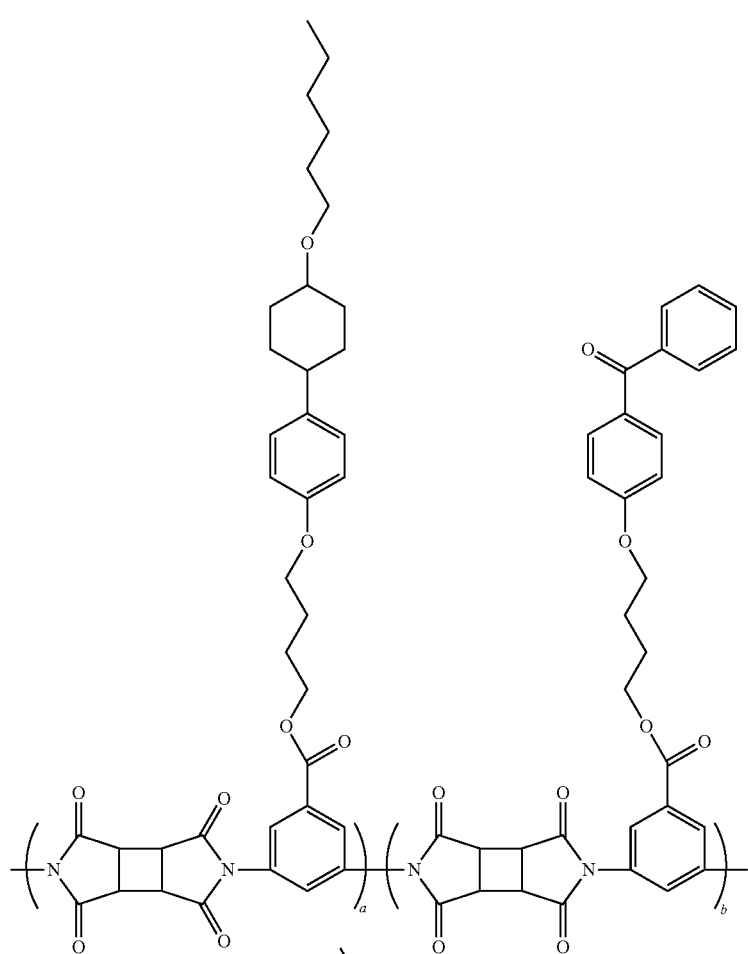
(Chemical Formula 4)
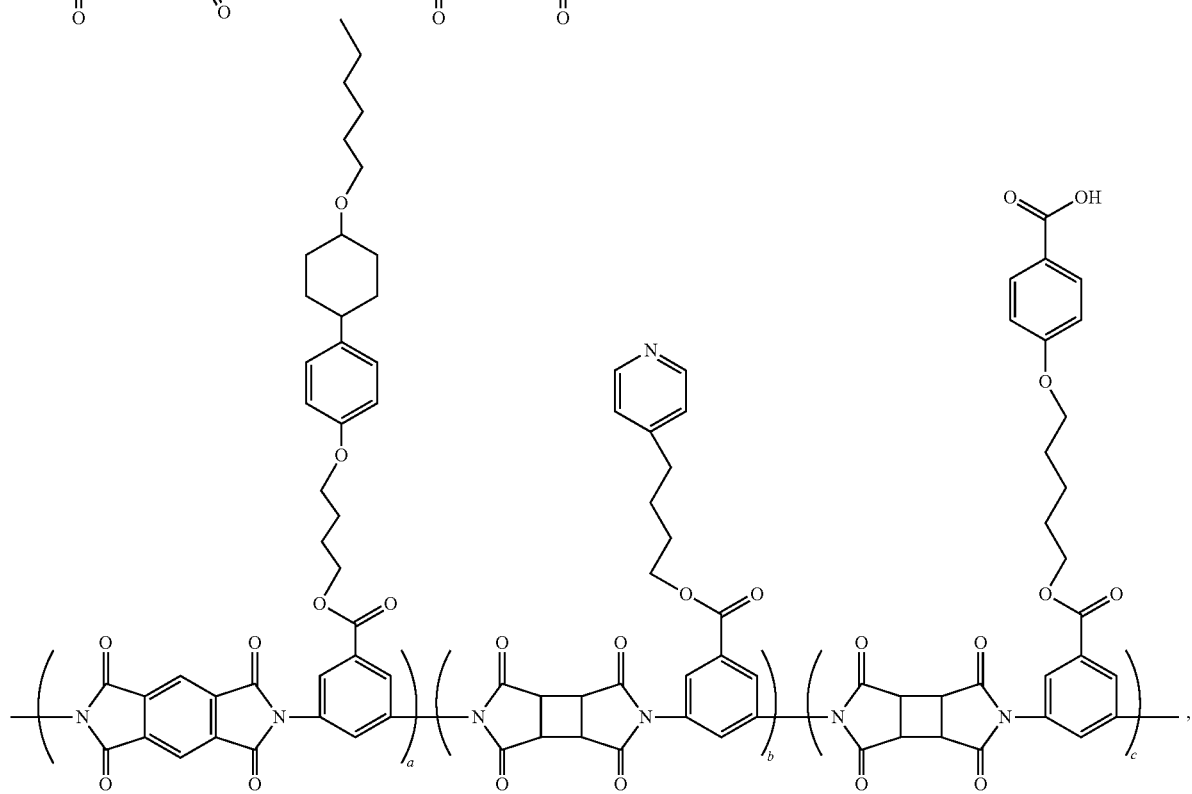

The first alignment layer 11 may have a multi-layer structure. A layer including the compound represented by Chemical Formula 1 may be located adjacent to the liquid crystal layer 3, and the compound represented by Chemical Formula 4 may be located adjacent to a first substrate 110.

However, this is not restrictive, and the first alignment layer 11 may include one layer. In this case, the content of the compound represented by Chemical Formula 1 may be greater than the content of the compound represented by Chemical Formula 4 at a location adjacent to the liquid crystal layer 3 in the first alignment layer 11. In addition, the content of the compound represented by Chemical Formula 4 may be greater than the content of the compound represented by Chemical Formula 1 at a location adjacent to the first substrate 110.

The second alignment layer 21 may include at least one of the compound represented by Chemical Formula 4 and a compound represented by Chemical Formula 5. For example, the second alignment layer 21 includes the compound represented by Chemical Formula 4, and may further include the compound represented by Chemical Formula 5. In Chemical Formula 5, a and b have values that are greater than zero and less than 1, and may be changed depending on exemplary embodiments.

the compound represented by Chemical Formula 5 may be greater than the content of the compound represented by Chemical Formula 4 at a location adjacent to the liquid crystal layer 3 in the second alignment layer 21. In addition, the content of the compound represented by Chemical Formula 4 may be greater than the content of the compound represented by Chemical Formula 1 at a location adjacent to the second substrate 210.

The first alignment layer 11 and the second alignment layer 21 according to the other exemplary embodiment may include an aromatic dianhydride. The aromatic dianhydride may pull an ion impurity included in the liquid crystal layer 3. As the aromatic dianhydride is included in the first alignment layer 11 and the second alignment layer 21, the ion impurity can be evenly dispersed into the first alignment layer 11 and the second alignment layer 21. Accordingly, a common voltage shift that occurs due to accumulation of an ion impurity is one substrate can be prevented.

According to the other exemplary embodiment of the present invention, the compound represented by Chemical Formula 1 included in the first alignment layer 11 includes a photo-polymerizable group, and the compound represented by Chemical Formula 4 and the compound repre- (Chemical Formula 5)

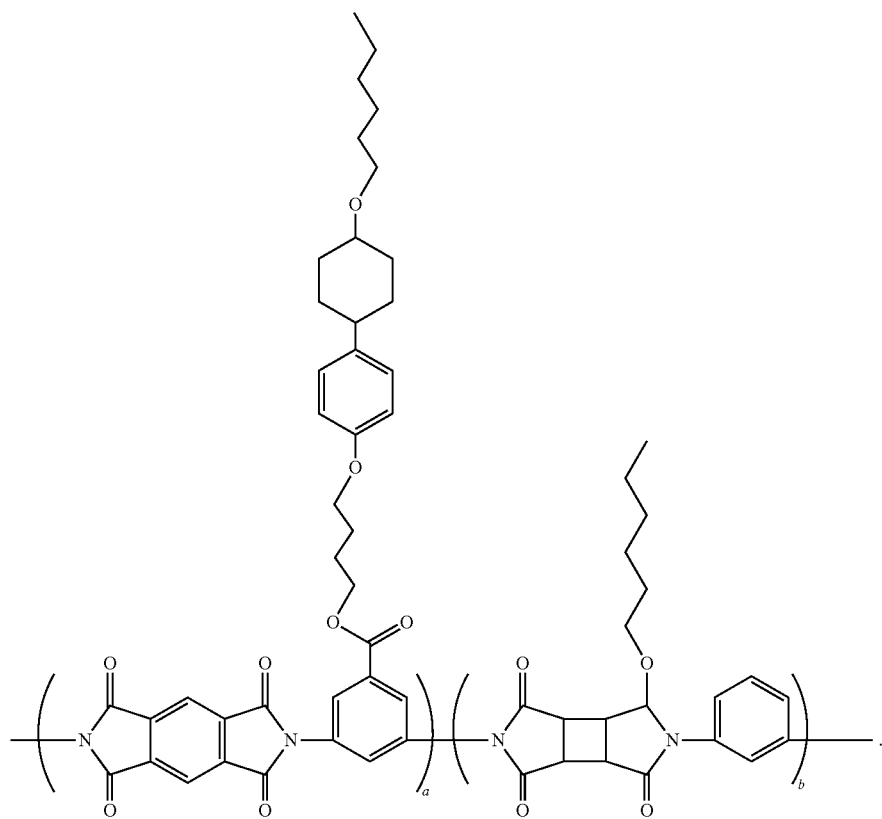

The second alignment layer 21 may have a multi-layer structure. A layer including the compound represented by Chemical Formula 5 may be located adjacent to the liquid crystal layer 3, and the compound represented by Chemical Formula 4 may be located adjacent to a second substrate 210.

However, this is not restrictive, and the second alignment layer 21 may include one layer. In this case, the content of sented by Chemical Formula 5 included in the second alignment layer 21 do not additionally include a photo-polymerizable group.

Thus, an reactive mesogen injected into the liquid crystal layer 3 in an electric field UV process may polymerized while being located adjacent to the first alignment layer 11. Protrusions 13 formed by polymerization of the reactive mesogen may be disposed between the first alignment layer 11 and the liquid crystal layer 3.

FIG. 2 is a cross-sectional view of a liquid crystal display that is curved according to an exemplary embodiment of the present invention. Referring to FIG. 2, a liquid crystal display according to an exemplary embodiment may be a curved liquid crystal display. Besides FIG. 2 illustrating a curved liquid crystal display according to the present exemplary embodiment, the curved liquid crystal display is the same as the liquid crystal display of FIG. 1. Thus, a duplicated description with respect to the same constituent elements will be omitted.

Figure 3:
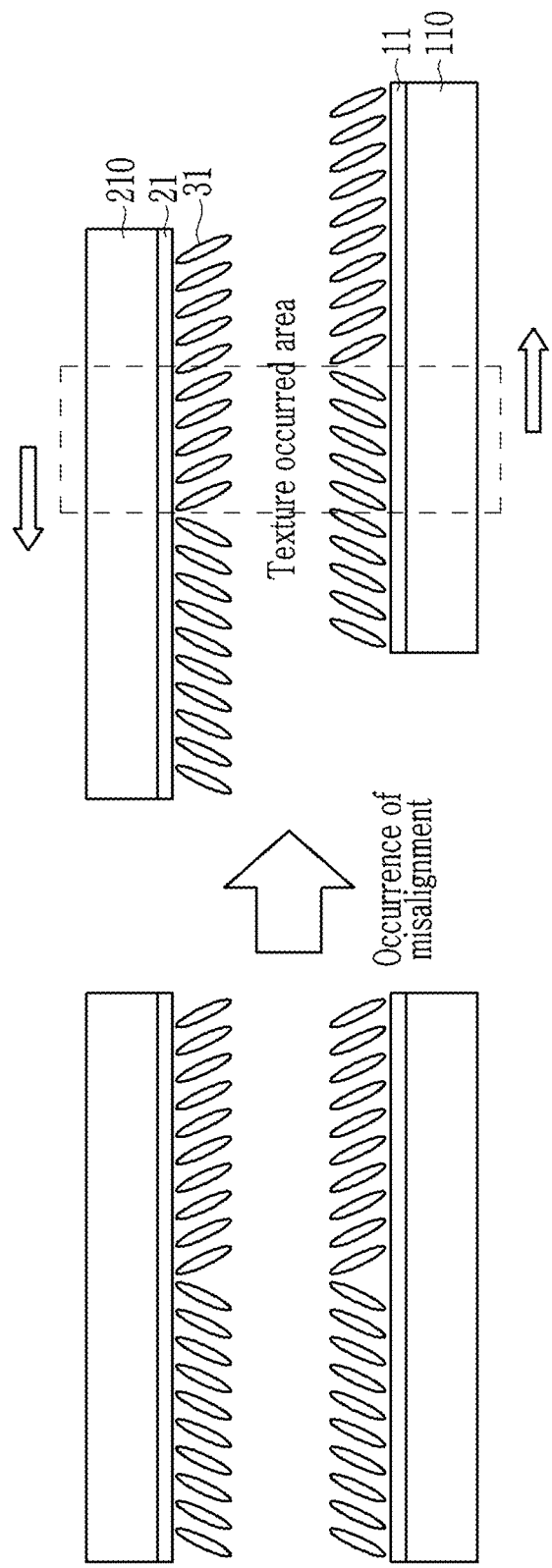
FIG. 3 illustrates a texture defect due to misalignment, which occurs when liquid crystal modules that are adjacent to upper and lower alignment layers are pre-tilted at the same angle.

FIG. 3 is provided to describe a texture failure due to misalignment of liquid crystal molecules in a case that pretilt angles of liquid crystal molecules that are adjacent to upper and lower alignment layers are the same.

In the curved display device, when a pretilt is formed in liquid crystal molecules 31 that are adjacent to a first substrate 110 and liquid crystal molecules 31 that are adjacent to a second substrate 210, the first substrate 110 and the second substrate 210 are misaligned when the display is curved. When the display panels are misaligned while the liquid crystal molecules 31 are pretilted in the same direction, an area where a pretilt direction of the liquid crystal molecules 31 that are adjacent to the first alignment layer 11 and a pretilt direction of the liquid crystal molecules 31 that are adjacent to the second alignment layer 21 are misaligned. Such an area may be an interface portion of neighboring domains. The area where pretilt directions of the liquid crystal molecules 31 are misaligned may be viewed as a texture failure in the screen. Thus, the texture corresponds to a portion that is darker than the periphery, and may be viewed as a stain.

However, referring to FIG. 2, the liquid crystal display according to the present exemplary embodiment includes a plurality of protrusions 13 disposed between the first alignment layer 11 and the liquid crystal layer 3. No protrusions may be disposed between the second alignment layer 21 and the liquid crystal layer 3, or a very small amount of protrusions may be disposed therebetween. Accordingly, liquid crystal molecules adjacent to the first substrate 110 may be arranged at an angle that is tilted with reference to a vertical state, and liquid crystal molecules adjacent to the second substrate 210 may be arranged substantially perpendicular to the second substrate 210. Thus, a texture due to misalignment of pretilt directions that is caused while the first substrate 110 and the second substrate 210 are bent can be prevented.

Figure 4:
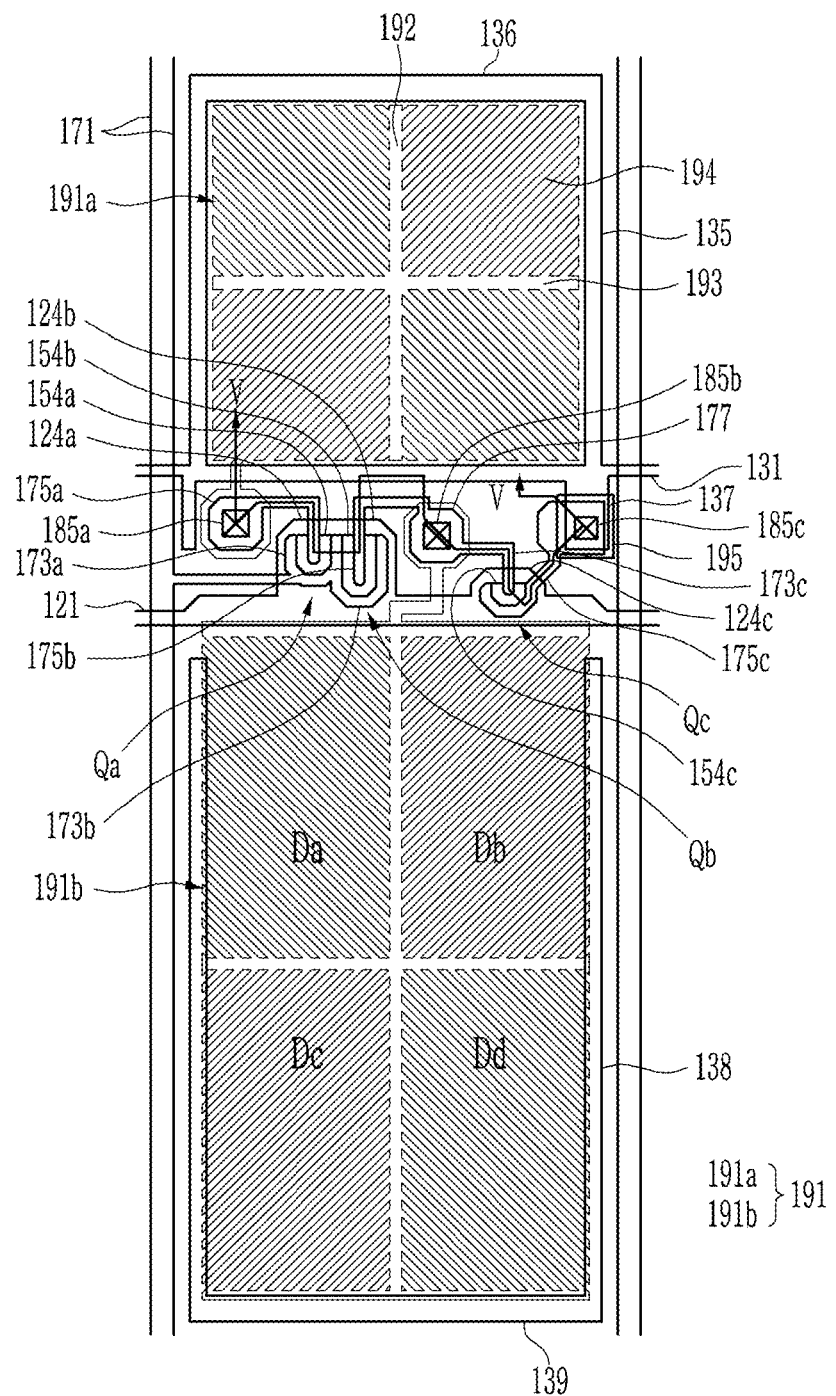
FIG. 4 is a top plane layout view of a pixel of the liquid crystal display according to the exemplary embodiment.
Figure 5:
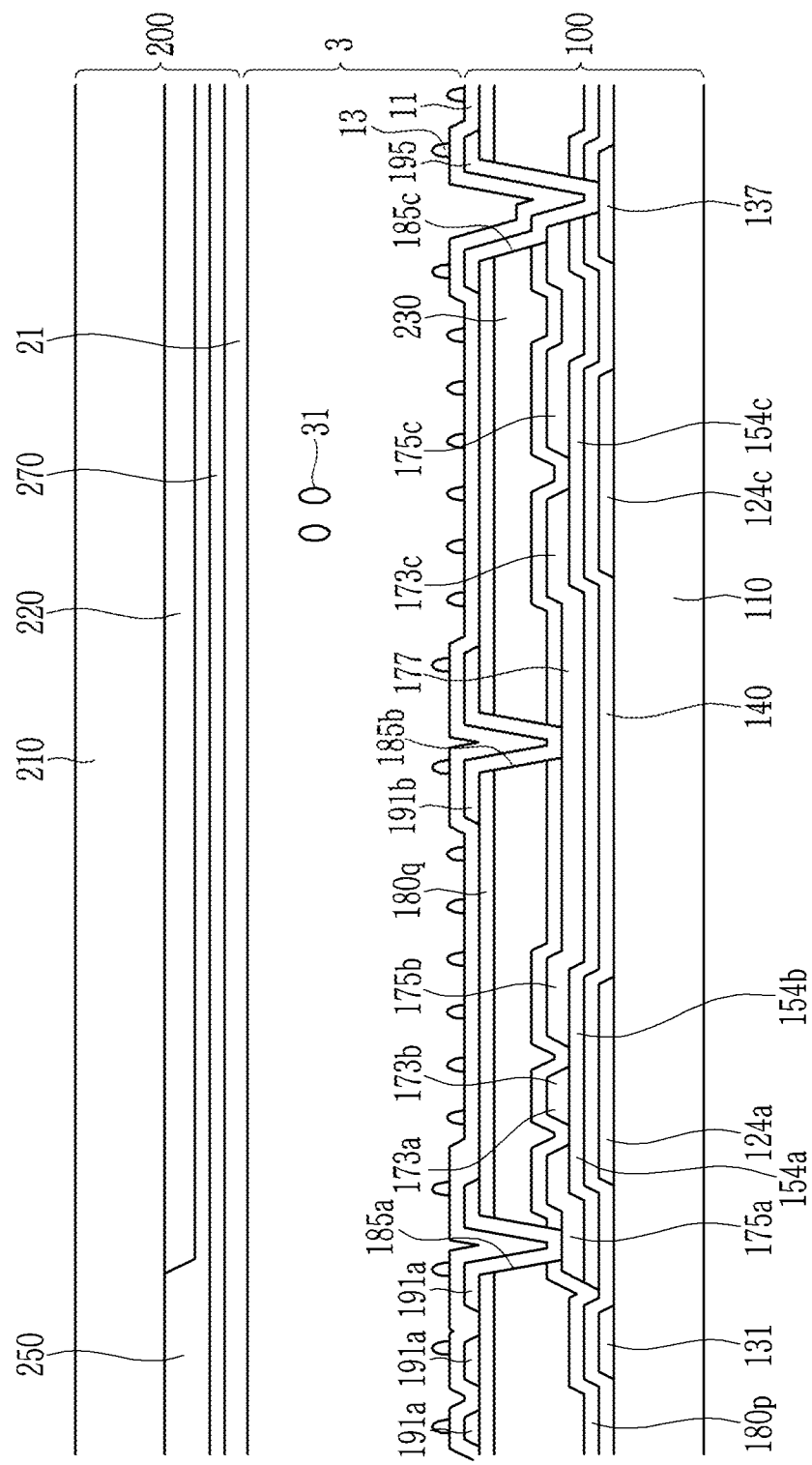
FIG. 5 is a cross-sectional view of FIG. 4, taken along the line V-V.

Hereinafter, referring to FIG. 4 and FIG. 5, a pixel according to an exemplary embodiment of the present invention will be described. FIG. 4 is a top plan layout view of a pixel of a liquid crystal display according to an exemplary embodiment. FIG. 5 is a cross-sectional view of FIG. 4 taken along the line V-V.

First, a lower display panel 100 will be described.

A gate conductor that includes a gate line 121 and a divided reference voltage line 131 is disposed in a first substrate 110 that is made of transparent glass or plastic and the like.

The gate line 121 includes a first gate electrode 124a, a second gate electrode 124b, and a third gate electrode 124c. The divided reference voltage line 131 includes first sustain electrodes 135 and 136 and a reference electrode 137. Although not being connected to the divided reference voltage line 131, second sustain electrodes 138 and 139 may be disposed while overlapping a second subpixel electrode 191b.

A gate insulating layer 140 is disposed on the first substrate 110, the gate line 121, and the divided reference voltage line 131.

A first semiconductor layer 154a, a second semiconductor layer 154b, and a third semiconductor layer 154c are disposed on the gate insulating layer 140. Although it is not shown in the drawings, an ohmic contact that is disposed on the semiconductor layers 154a, 154b, and 154c may further be included depending on exemplary embodiments.

A data conductor that includes data lines 171 that are connected with a first source electrode 173a and a second source electrode 173b, a first drain electrode 175a, a second drain electrode 175b, a third source electrode 173c, and a third drain electrode 175c are disposed on the gate insulating layer 140 and the semiconductor layers 154a, 154b, and 154c.

The first gate electrode 124a, the first source electrode 173a, and the first drain electrode 175a form a first thin film transistor Qa together with the first semiconductor layer 154a. The second gate electrode 124b, the second source electrode 173b, and the second drain electrode 175b form a second thin film transistor Qb together with the second semiconductor layer 154b. The third gate electrode 124c, the third source electrode 173c, and the third drain electrode 175c form a third thin film transistor Qc together with the third semiconductor layer 154c.

The second drain electrode 175b is connected with the third source electrode 173c, and includes an expansion portion 177 that is widely expanded.

A first passivation layer 180p is disposed on the data conductors 171, 173c, 175a, 175b, and 175c and the semiconductor layers 154a, 154b, and 154c.

A color filter 230 is disposed on the first passivation layer 180p. The color filter 230 vertically expends along two adjacent data lines 171. In the exemplary embodiment, the color filter 230 is included in the lower display panel 100, but this is not restrictive. The color filter 230 may be included in an upper display panel 200.

A second passivation layer 180q is disposed on the color filter 230. The first passivation layer 180p and the second passivation layer 180q may include an inorganic insulating layer such as a silicon nitride or a silicon oxide.

The second passivation layer 180q prevents the color filter 230 from being lifted, and suppresses the liquid crystal layer 3 from being contaminated due to an organic material such as a solvent inflowing from the color filter 230, thereby preventing a defect such as an afterimage that can occur when a screen is driven.

The first passivation layer 180p and the second passivation layer 180q include a first contact hole 185a and a second contact hole 185b that respectively overlap the first drain electrode 175a and the second drain electrode 175b.

The first passivation layer 180p, the second passivation layer 180q, and the gate insulating layer 140 include a third contact hole 185c that overlaps a part of a reference electrode 137 and a part of the third drain electrode 175c, and the third contact hole 185c is covered by a connection member 195. The connection member 195 electrically connects the third drain electrode 175c and the reference electrode 137 that is overlapped with the third contact hole 185c.

Pixel electrodes 191 are disposed on the second passivation layer 180q. As one of field generating electrodes, the respective pixel electrodes 191 are separated from each other, interposing the gate line 121 therebetween, and thus a first subpixel electrode 191a and a second subpixel electrode 191b that neighbor each other in a column direction with respect to the gate line 121 are formed.

The pixel electrode 191 may include a transparent material such as ITO and IZO.

The first subpixel electrode 191a and second subpixel electrode 191b include a cross-shaped branch portion having a quadrangular shape and including a horizontal stem portion 193 and a vertical stem portion 192 crossing the horizontal stem portion 193. Further, each of the first subpixel electrode 191a and the second subpixel electrode 191b is divided into a first sub-area Da, a second sub-area Db, a third sub-area Dc, and a fourth sub-area Dd by the horizontal stem portion 193 and the vertical stem portion 192, and each of the sub-areas Da to Dd includes a plurality of fine branch portions 194.

The first subpixel electrode 191a and the second subpixel electrode 191b are respectively connected with the first drain electrode 175a or the second drain electrode 175b through the first contact hole 185a and the second contact hole 185b. The first subpixel electrode 191a and the second subpixel electrode 191b receive a data voltage from the first drain electrode 175a and the second drain electrode 175b. A part of the data voltage applied to the second drain electrode 175b is divided through the third source electrode 173c such that the magnitude of the voltage applied to the first subpixel electrode 191a is greater than that of the voltage applied to the second subpixel electrode 191b.

Since the first subpixel electrode 191a and the second subpixel electrode 191b applied with the data voltage generate an electric field together with a common electrode 270 of the upper display panel 200, a direction of liquid crystal molecules 31 of the liquid crystal layer 3 disposed between the two electrodes 191 and 270 is determined. Depending on the direction of the liquid crystal molecules 31, determined as described above, luminance of light passed through the liquid crystal layer 3 is changed.

The description of the thin film transistor and the pixel electrode 191 described up to now are just exemplary, and a structure of the thin film transistor and a design of the pixel electrode may be modified in order to improve side visibility.

A first alignment layer 11 and protrusions 13 are disposed between the pixel electrode 191 and the liquid crystal layer 3. Since the first alignment layer 11 and the protrusions 13 are the same as those in the exemplary embodiment described with reference to FIG. 1 and FIG. 2, no further description will be provided.

Next, the upper display panel 200 will be described.

The second substrate 210 is disposed to be overlapped with the first substrate 110 while being separated therefrom. A light blocking member 220 is disposed between the second substrate 210 and the liquid crystal layer 3. The light blocking member 220 is disposed in the upper display panel 200 to be overlapped with an area where the data lines 171 of the lower display panel 100 are disposed and an area where the thin film transistors are disposed. In the present specification, the light blocking member 220 is described and illustrated as being included in the upper display panel 200, but this is not restrictive. The light blocking member 220 may be included in the lower display panel 100 in other exemplary embodiments.

An overcoat 250 is disposed between the light blocking member 220 and the liquid crystal layer 3. The overcoat 250 may be omitted in other exemplary embodiments.

The common electrode 270, which is one of field generating electrodes, is disposed between the overcoat 250 and the liquid crystal layer 3. The common electrode 270 generates an electric field together with the pixel electrodes 191 of the lower display panel 100 to determine a direction of the liquid crystal molecules 31 of the liquid crystal layer 3. In the present specification, the common electrode 270 is described and illustrated as being disposed in the upper display panel 200, but this is not restrictive. The common electrode 270 may be disposed in the lower display panel 100 in other exemplary embodiments.

The liquid crystal layer 3 includes the liquid crystal molecules 31. In this case, the liquid crystal layer 3 may include some of a reactive mesogen in an unreacted state. In a manufacturing process of the liquid crystal display, the reactive mesogen is included in the liquid crystal layer 3 and form protrusions by being reacted during an electric field UV irradiation process. The reactive mesogen may partially remain in the liquid crystal layer 3.

Figure 6:
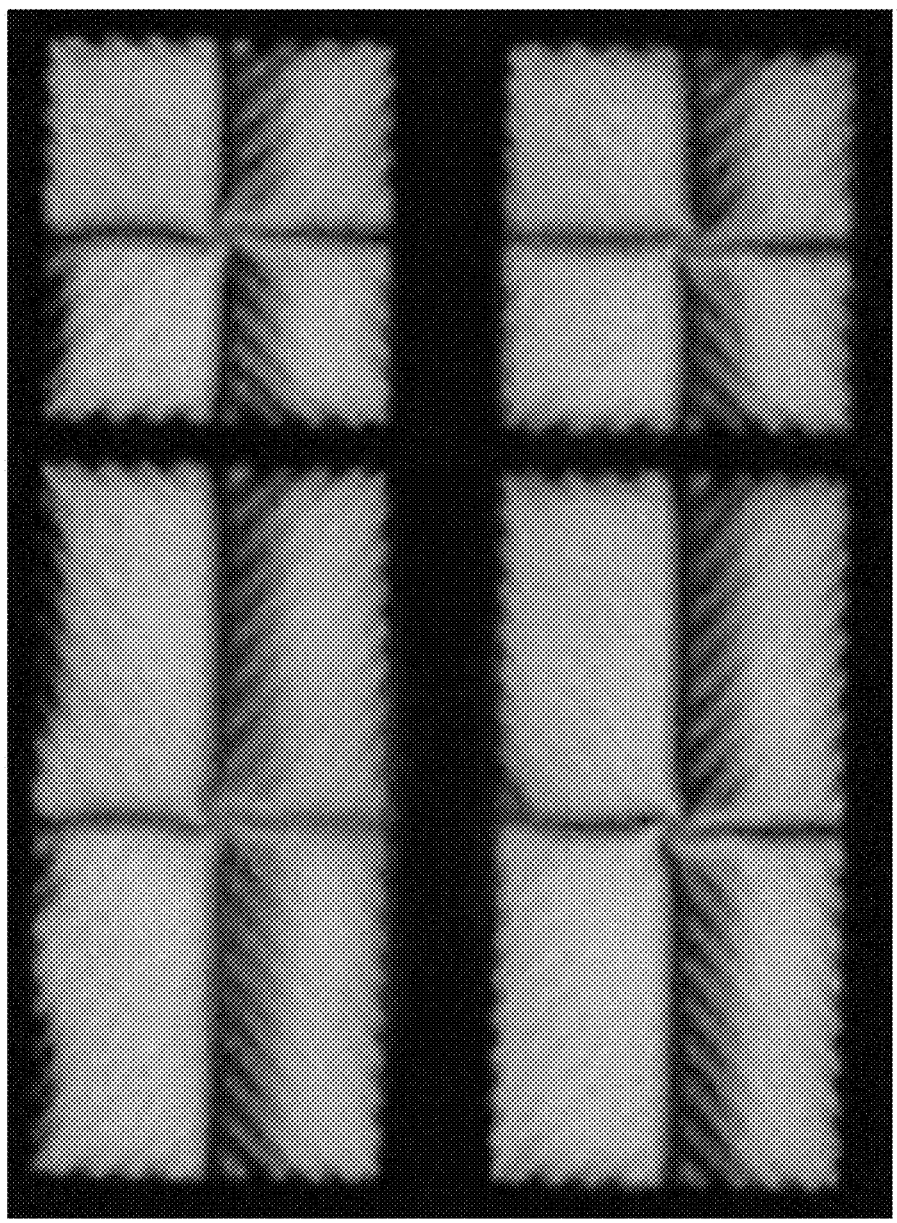
FIG. 6, FIG. 7, and FIG. 8 are images that show whether textures are generated or not in display devices according to Comparative Example 1, Comparative Example 2, and an exemplary embodiment.
Figure 7:
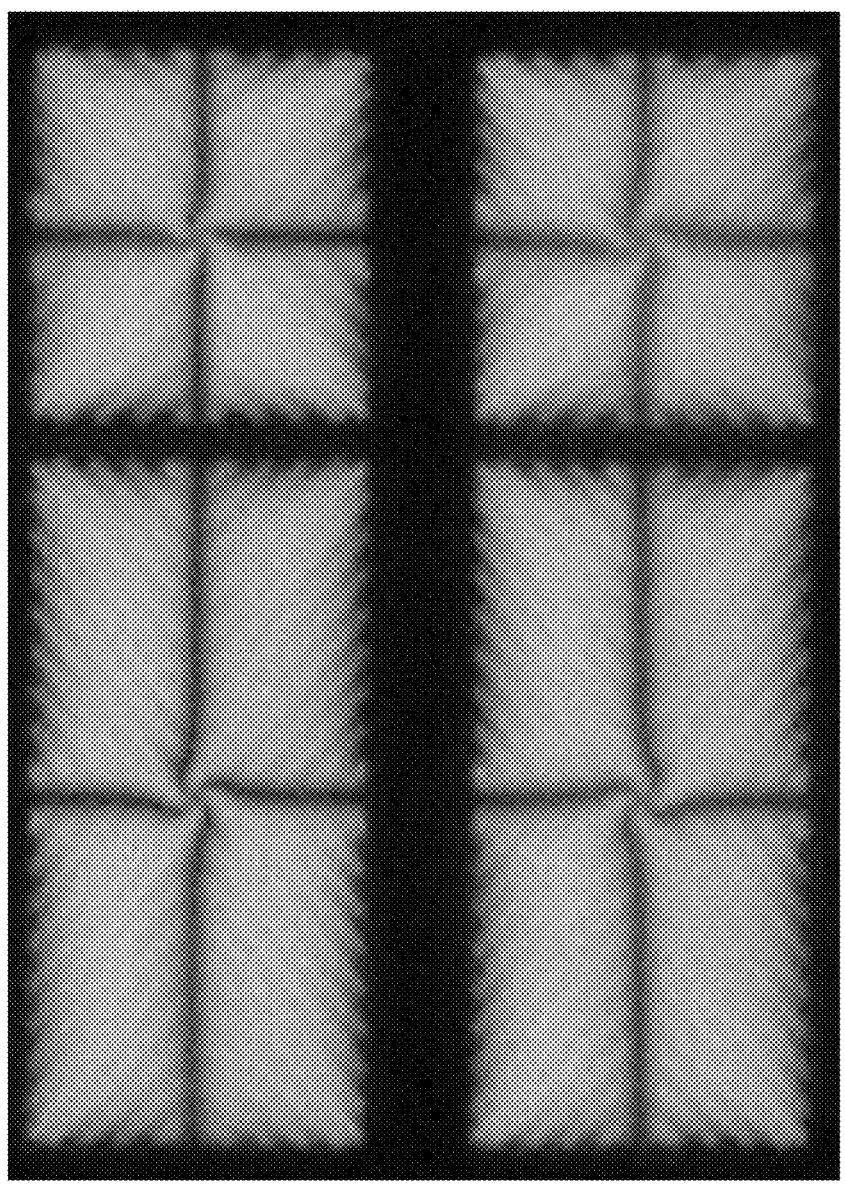
Figure 8:
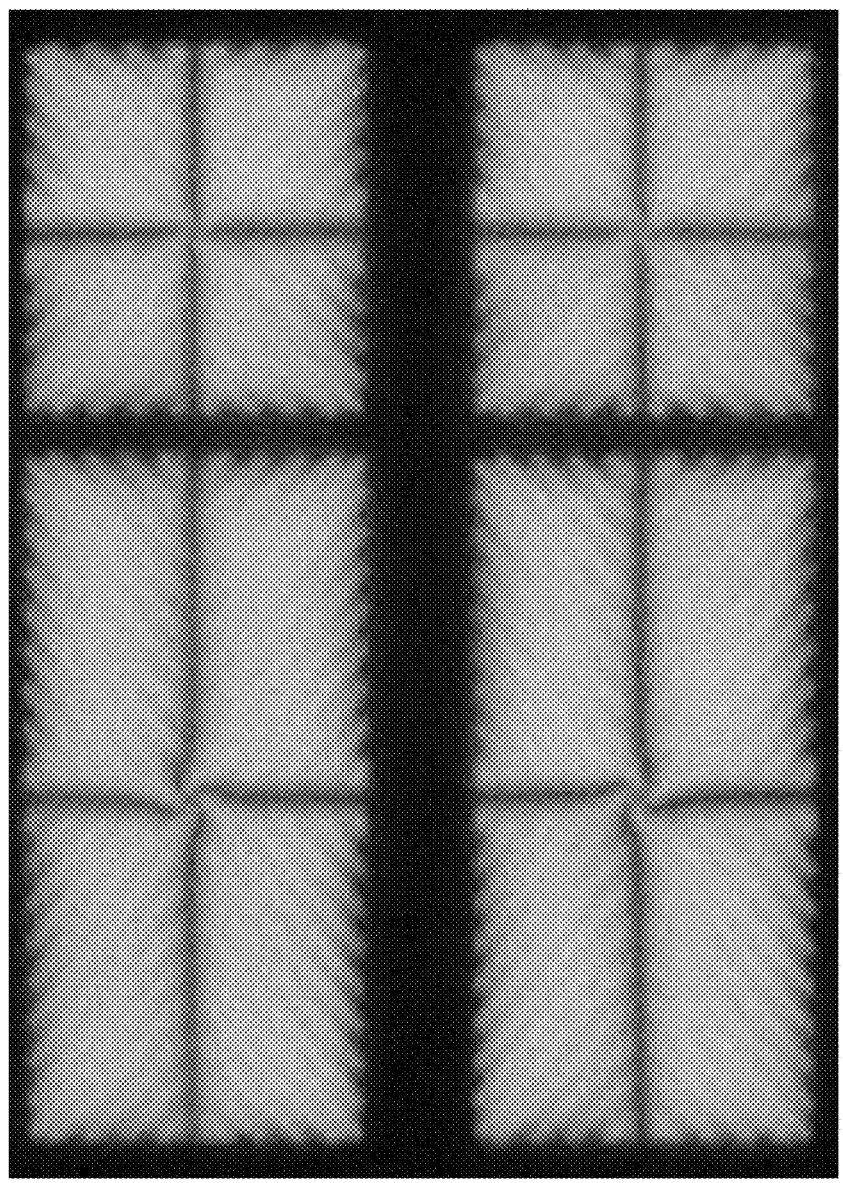
Figure 9:
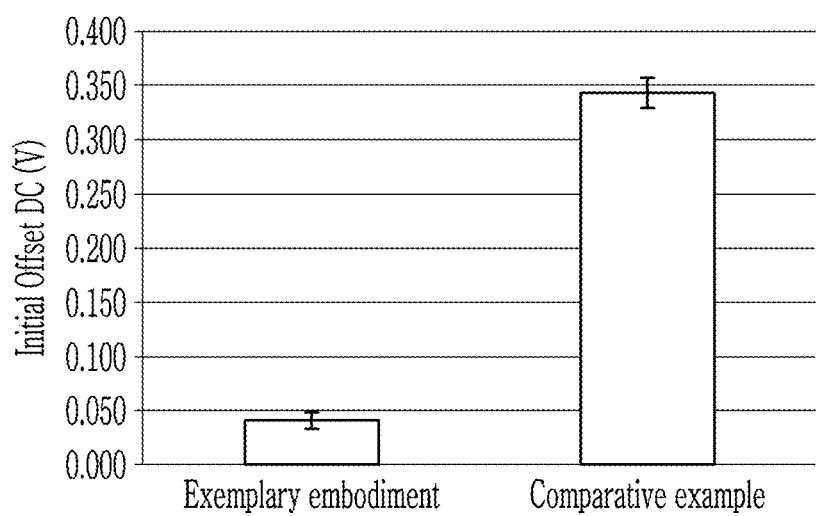
FIG. 9 is a graph that illustrates initial common voltage offset values according to the exemplary embodiment and the comparative examples.

Hereinafter, an exemplary embodiment and comparative examples will be described with reference to FIG. 6, FIG. 7, FIG. 8, and FIG. 9. FIG. 6, FIG. 7, and FIG. 8 are images that show whether textures are generated or not in display devices according to Comparative Example 1, Comparative Example 2, and an exemplary embodiment. FIG. 9 is a graph that illustrates initial common voltage offset values according to an exemplary embodiment and comparative examples.

FIG. 6 is an image of a curved display device of which upper and lower display panels include the same alignment layer. FIG. 7 is an image of a display device of which upper and lower display panels include different alignment layers and the lower alignment layer includes an aromatic dianhydride. FIG. 8 is an image of a curved display device that includes the alignment layers according to the exemplary embodiment of the present invention.

When the display device of which the upper and lower display panels include the same alignment layer is curved, as shown in FIG. 6, a significant amount of textures occur as the liquid crystal molecules are misaligned.

According to the exemplary embodiment shown in FIG. 8, when the alignment layer that excludes the aromatic dianhydride is used, alignment of liquid crystal molecules is effective and textures occur almost at a level of FIG. 7, that is, textures hardly occur when the liquid display device is curved.

Meanwhile, referring to FIG. 9, an initial common voltage offset value is almost zero in case of the display device of the exemplary embodiment of FIG. 8 compared to the display device according to the comparative example of FIG. 7, and an initial common voltage offset value of the comparative example is about 0.35 V.

In the liquid crystal displays of FIG. 7 and FIG. 8, textures are insignificantly generated when the displays are curved, but in the comparative example of FIG. 7, the common voltage shift significantly occurred. As described, since the two alignment layers do not include the aromatic dianhydride in the exemplary embodiment of the present invention, accumulation of an ion impurity at one side can be prevented and a constant common voltage can be maintained.

According to the exemplary embodiments, asymmetric accumulation of an ion impurity on a display panel can be prevented to thereby preventing occurrence of an afterimage and preventing blue from being viewed as yellowish.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
   a first substrate;
   a second substrate overlapping the first substrate and separated from the first substrate;
   a liquid crystal layer disposed between the first substrate and the second substrate, and comprising a plurality of liquid crystal molecules;
   a first alignment layer disposed between the first substrate and the liquid crystal layer; and
   a second alignment layer disposed between the second substrate and the liquid crystal layer,
   wherein the first alignment layer comprises at least one of a compound represented by Chemical Formula 1 and a compound represented by Chemical Formula 2, (Chemical Formula 1)

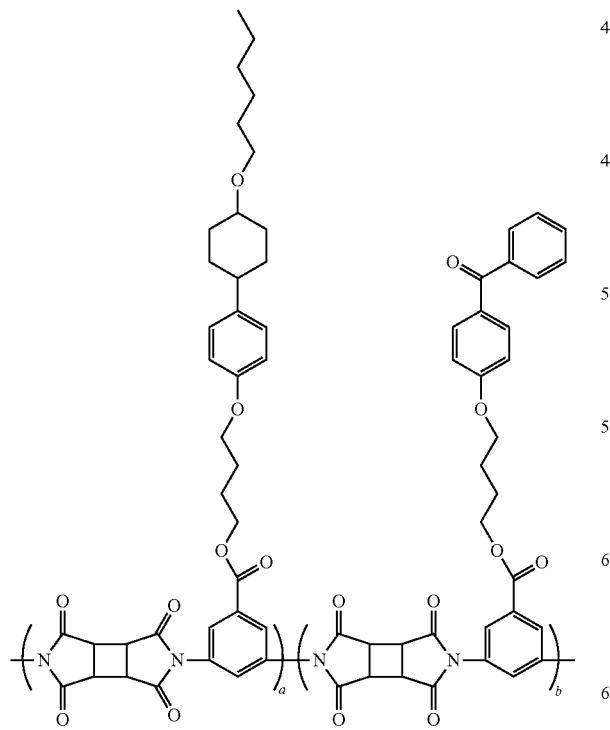

(Chemical Formula 2)

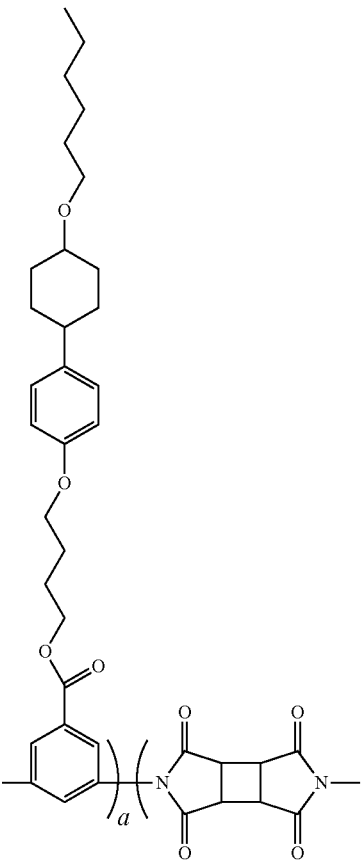

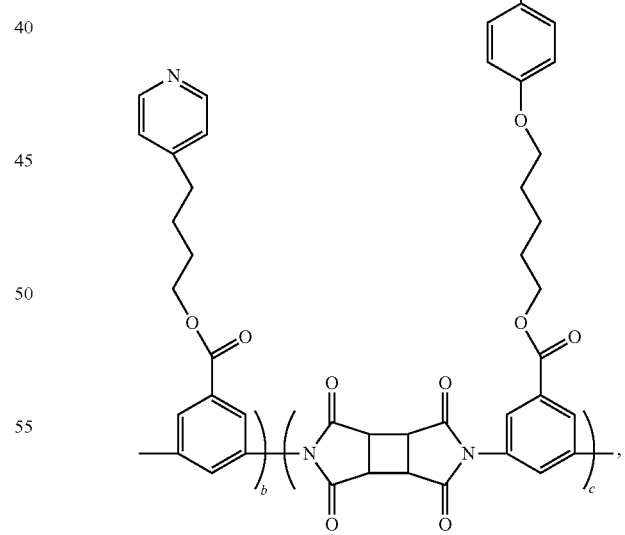

and wherein, in Chemical Formula 1 and Chemical Formula 2, a, b, and c have values that are greater than 0 and less than 1, wherein the second alignment layer comprises a compound represented by Chemical Formula 3:

(Chemical Formula 3)

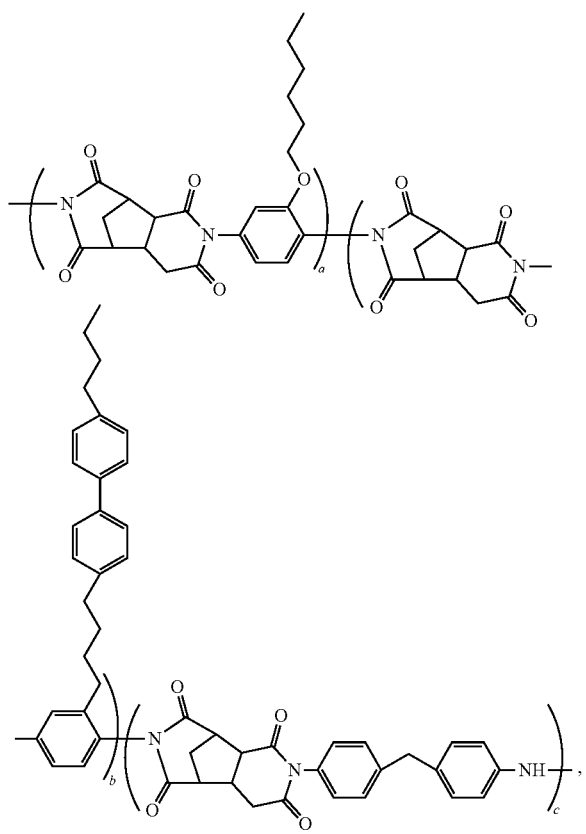

and wherein, in Chemical Formula 3, a, b, and c have values that are greater than 0 and less than 1.

2. The display device of claim 1, wherein the first alignment layer comprises the compound represented by Chemical Formula 1, and
the second alignment layer does not comprise a photo-polymerizable group.

3. The display device of claim 1, further comprising a plurality of protrusions disposed between the first alignment layer and the liquid crystal layer,
wherein at least one of the plurality of protrusions comprises a photo-polymerizable group and a polymer polymerized with a reactive mesogen.

4. The display device of claim 1, wherein, while no voltage is applied, liquid crystal molecules that are adjacent to the first substrate have a pre-tilt and liquid crystal molecules that are adjacent to the second substrate are aligned to be vertical with respect to the second substrate.

5. The display device of claim 1, wherein the display device is a curved liquid crystal display.

6. A liquid crystal display, comprising:
a first substrate;
a second substrate overlapping the first substrate and separated from the first substrate;
a liquid crystal layer that is disposed between the first substrate and the second substrate, and comprising a plurality of liquid crystal molecules;
a first alignment layer disposed between the first substrate and the liquid crystal layer; and
a second alignment layer disposed between the second substrate and the liquid crystal layer,
wherein the first alignment layer and the second alignment layer comprise a compound represented by Chemical Formula 4:

(Chemical Formula 4)

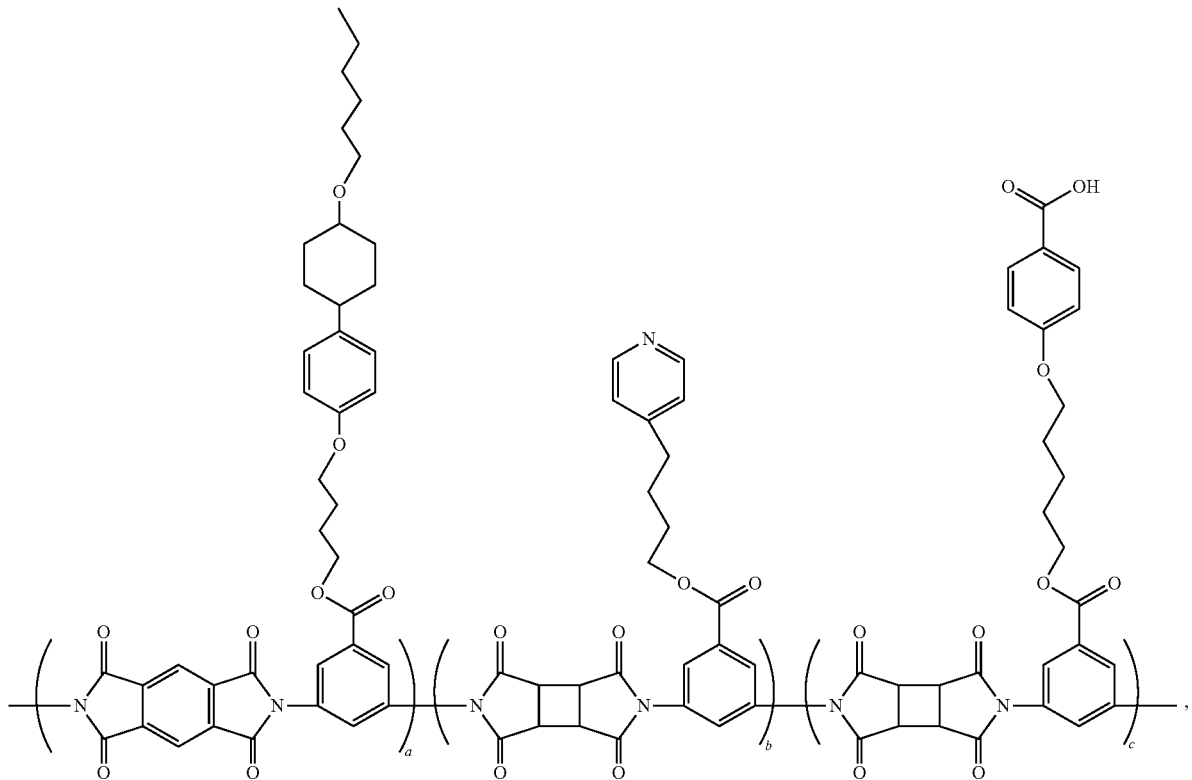

wherein the second alignment layer further comprises a compound represented by Chemical Formula 5:

(Chemical Formula 5)

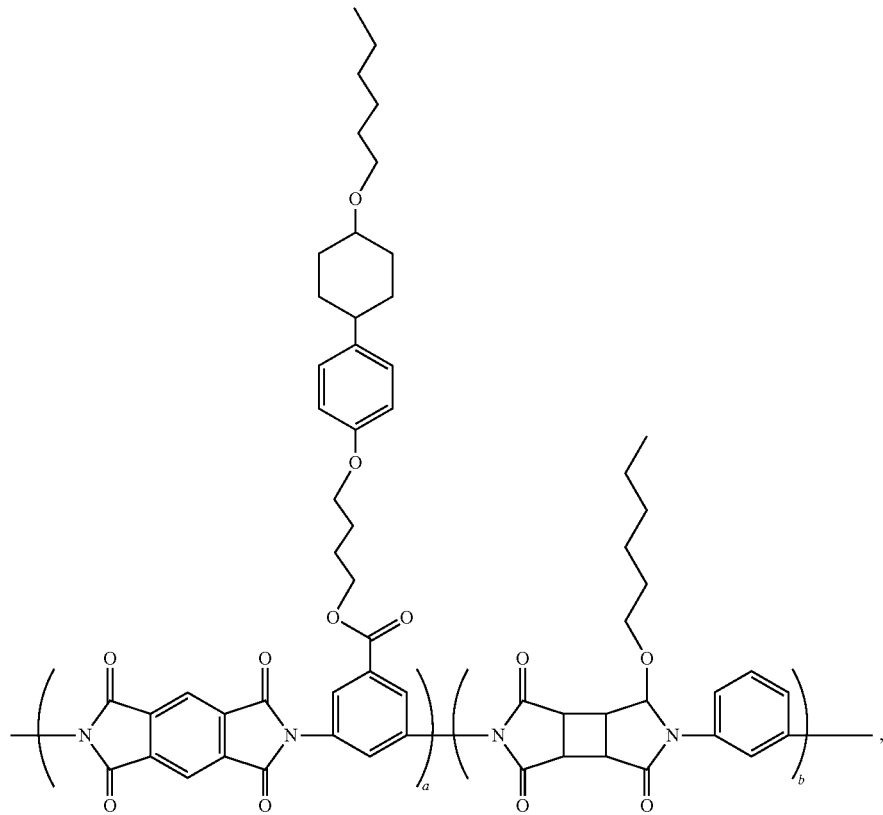

and wherein, in Chemical Formula 4 and in Chemical Formula 5, a, b, and c have values that are greater than 0 and less than 1.

7. The liquid crystal display of claim 6, wherein the first alignment layer further comprises a compound represented by Chemical Formula 1:

(Chemical Formula 1)

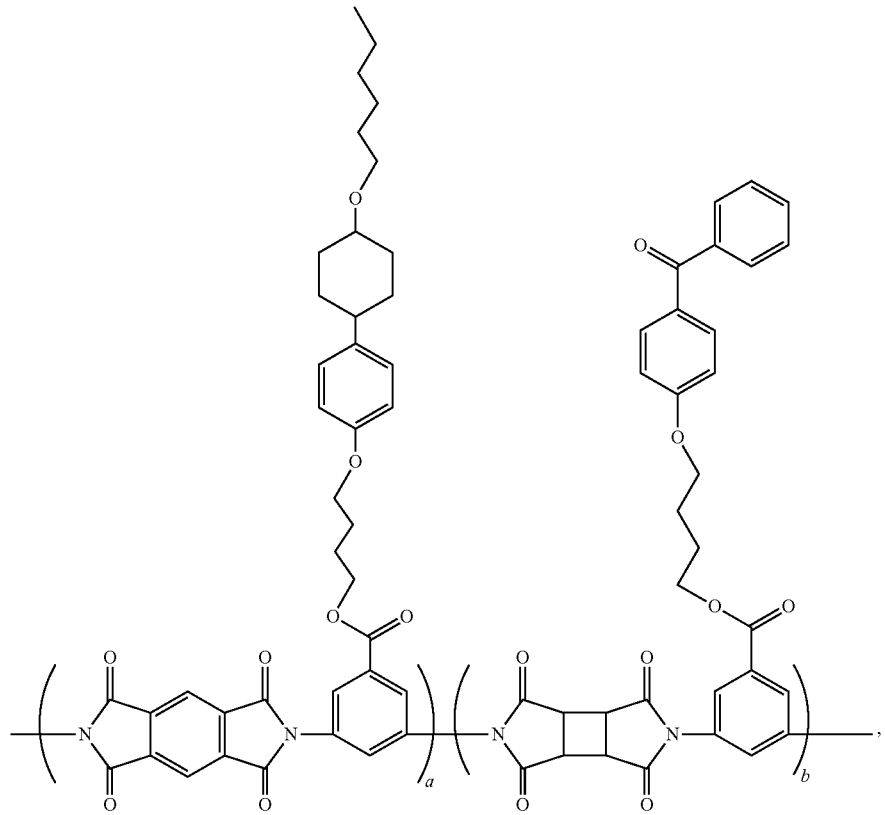

and wherein, in Chemical Formula 1, a and b have values that are greater than 0 and less than 1.

8. The liquid crystal display of claim 6, further comprising a plurality of protrusions disposed between the first alignment layer and the liquid crystal layer, wherein at least one of the plurality of protrusions comprises a photo-polymerizable group and a polymer polymerized with a reactive mesogen.

9. The liquid crystal display of claim 6, wherein, while no voltage is applied, liquid crystal molecules that are adjacent to the first substrate have pre-tilt and liquid crystal molecules that are adjacent to the second substrate are aligned to be vertical with respect to the second substrate.

10. The liquid crystal display of claim 6, wherein the liquid crystal display is a curved liquid crystal display.

11. A liquid crystal display, comprising:
a first substrate;
a second substrate overlapping the first substrate and separated from the first substrate;
a liquid crystal layer disposed between the first substrate and the second substrate, and comprising a plurality of liquid crystal molecules;
a first alignment layer disposed between the first substrate and the liquid crystal layer; and
a second alignment layer disposed between the second substrate and the liquid crystal layer,
wherein, when no voltage is applied, liquid crystal molecules that are adjacent to the first alignment layer are tilted with respect to the first substrate at an angle greater than an angle at which liquid crystal molecules that are adjacent to the second alignment layer are tilted with respect to the second substrate,
the first alignment layer and the second alignment layer do not comprise an aromatic dianhydride,
the first alignment layer comprises a compound represented by Chemical Formula 1 and a compound represented by Chemical Formula 2, and
the second alignment layer comprises a compound represented by Chemical Formula 3:

(Chemical Formula 1)
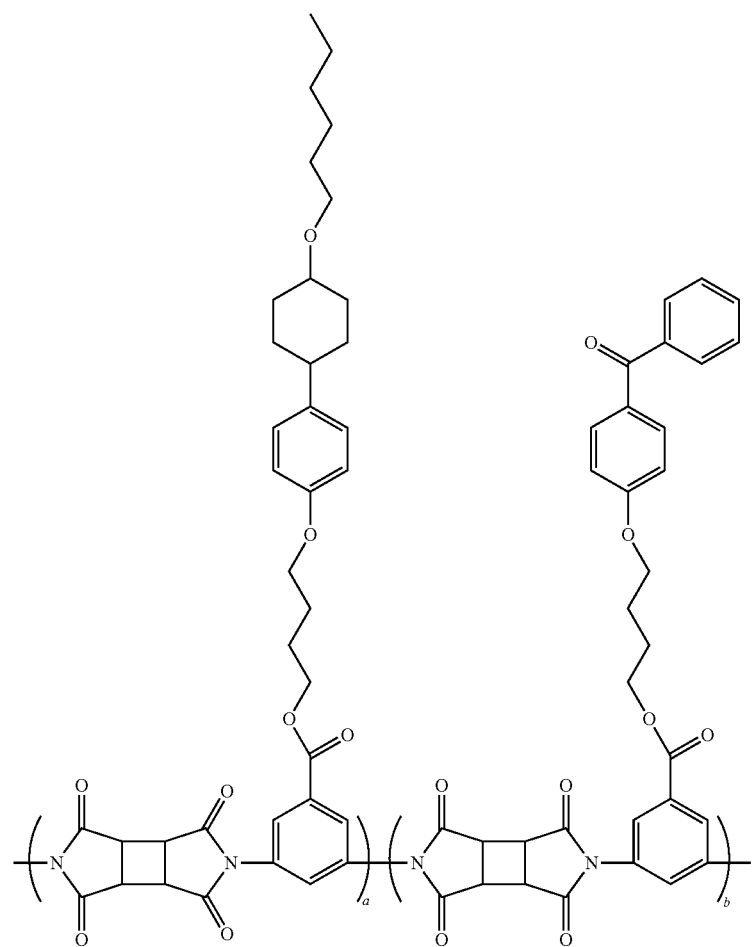

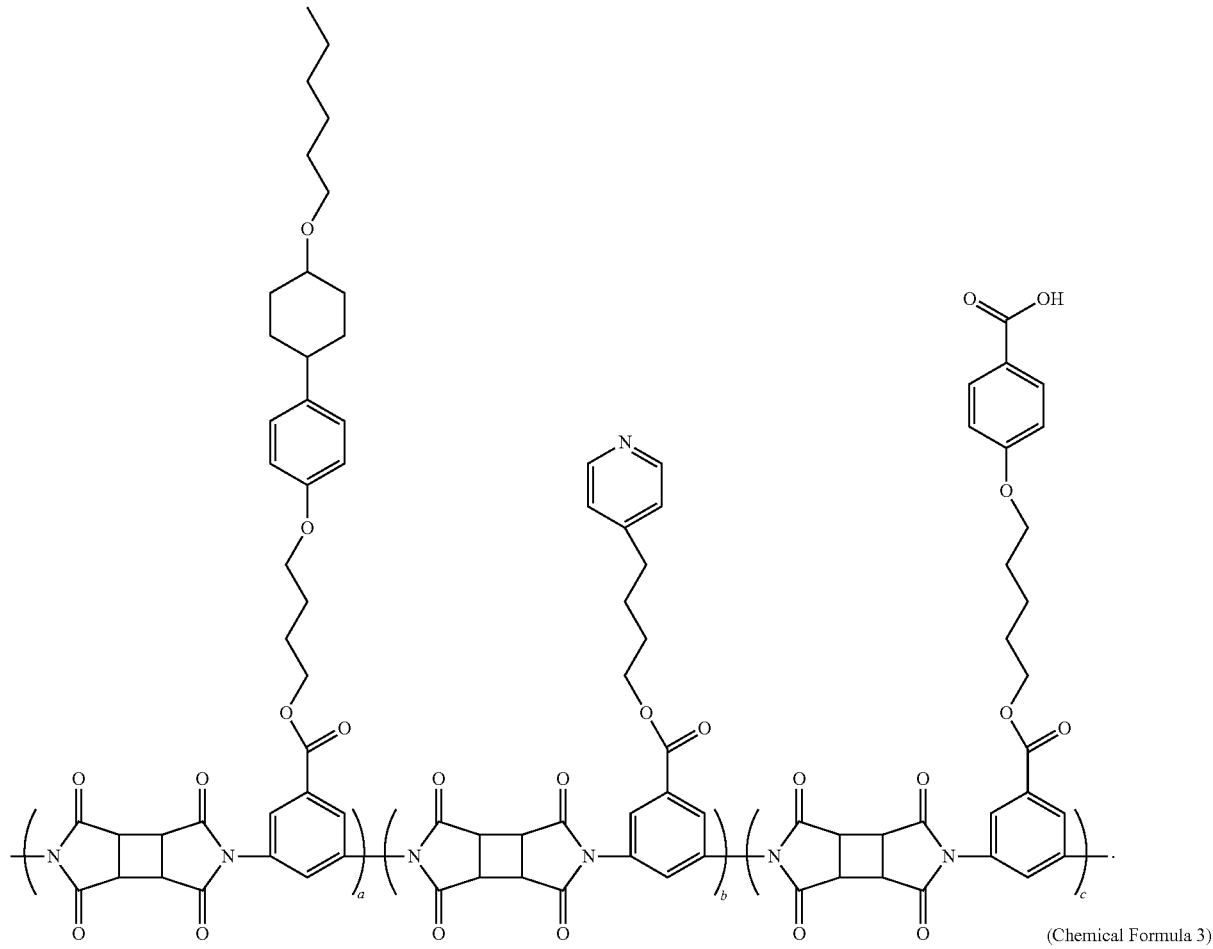

(Chemical Formula 2)

(Chemical Formula 3)

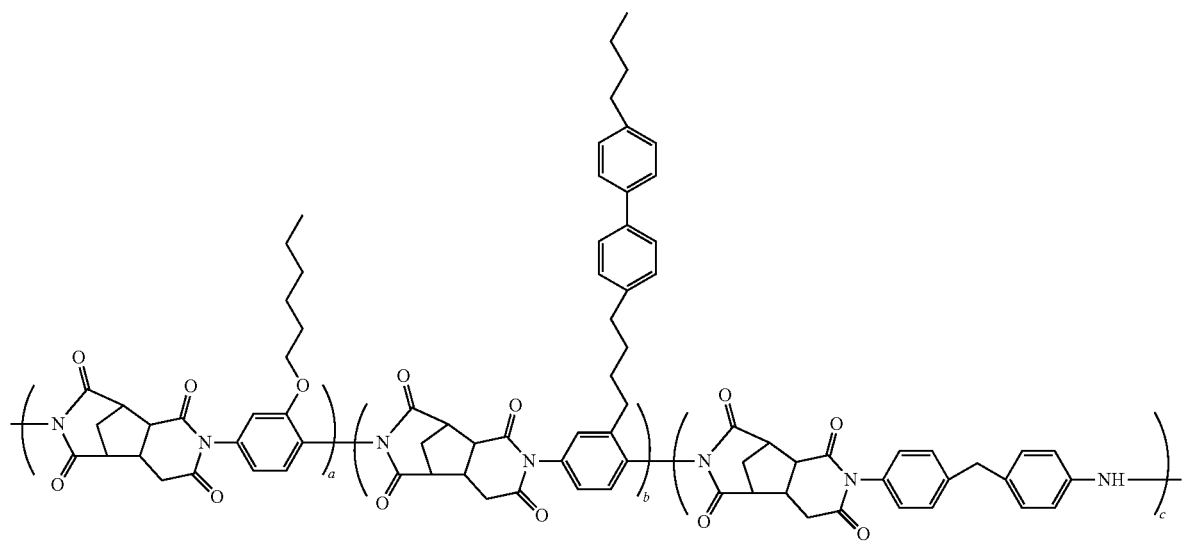

wherein, in Chemical Formula 1, Chemical Formula 2, and Chemical Formula 3, a, b, and c have values that are greater than 0 and less than 1.

12. The liquid crystal display of claim 11, wherein the first alignment layer comprises a photo-polymerizable group, and the second alignment layer does not comprise a photo-polymerizable group.

13. The liquid crystal display of claim 11, wherein a plurality of protrusions are disposed between the first alignment layer and the liquid crystal layer.

* * * * *